US012607333B2

(12) United States Patent
Morris et al.

(10) Patent No.: US 12,607,333 B2
(45) Date of Patent: Apr. 21, 2026

(54) CROSSARM RETROFIT SYSTEM

(71) Applicant: SIGNIFY HOLDING B.V., Eindhoven (NL)

(72) Inventors: Tyler Brian Morris, Liverpool, NY (US); Walten Peter Owens, Manlius, NY (US); Priya Ranjan Haridasan, East Syracuse, NY (US)

(73) Assignee: SIGNIFY HOLDING B.V., Eindhoven (NL)

( * ) Notice: Subject to any disclaimer, the term of this patent is extended or adjusted under 35 U.S.C. 154(b) by 77 days.

(21) Appl. No.: 18/697,672

(22) PCT Filed: Oct. 3, 2022

(86) PCT No.: PCT/EP2022/077451
§ 371 (c)(1),
(2) Date: Apr. 1, 2024

(87) PCT Pub. No.: WO2023/057378
PCT Pub. Date: Apr. 13, 2023

(65) Prior Publication Data

US 2025/0230924 A1 Jul. 17, 2025

Related U.S. Application Data

(60) Provisional application No. 63/252,404, filed on Oct. 5, 2021.

(30) Foreign Application Priority Data

Oct. 12, 2021 (EP) .................................... 21202193

(51) Int. Cl.
*F21V 21/116* (2006.01)
*F21V 21/30* (2006.01)
(Continued)

(52) U.S. Cl.
CPC ............ *F21V 21/116* (2013.01); *F21V 21/30* (2013.01); *F21V 23/06* (2013.01); *F21W 2131/10* (2013.01)

(58) Field of Classification Search
CPC ..... F21W 2131/10; F21V 23/06; F21V 21/30; F21V 21/116
See application file for complete search history.

(56) References Cited

U.S. PATENT DOCUMENTS 10,907,810 B1 2/2021 Moghal et al.
11,262,036 B1 * 3/2022 Hein .................... F21V 23/045
(Continued)

FOREIGN PATENT DOCUMENTS

CN 102374503 B 1/2015
CN 213146490 U 5/2021
(Continued)

OTHER PUBLICATIONS

Innovation Q+ NPL Search (Year: 2024).*

*Primary Examiner* — Anabel Ton

(57) ABSTRACT

A crossarm retrofit system for a lamp of a lighting array that includes a crossarm can include a crossarm mounting system coupled to the crossarm, where the crossarm mounting system comprises a bottom component, a top component, and a coupling assembly, where the top component is configured to abut against a top surface of the crossarm, where the bottom component is configured to abut against a bottom surface of the crossarm, where the coupling assembly is configured to be disposed adjacent to a rear surface of the crossarm, and where the coupling assembly is further configured to force the top component and the bottom component to engage and secure the crossarm.

14 Claims, 14 Drawing Sheets

(51) Int. Cl.
*F21V 23/06* (2006.01)
*F21W 131/10* (2006.01)

(56) References Cited

U.S. PATENT DOCUMENTS

| | | | |
|---|---|---|---|
| 2005/0279200 | A1 | 12/2005 | Duginske |
| 2019/0041042 | A1 | 2/2019 | Jurkovic |

FOREIGN PATENT DOCUMENTS

| | | | |
|---|---|---|---|
| CN | 213394490 | U | 6/2021 |
| EP | 2876357 | A1 | 5/2015 |
| KR | 2035700 | B1 | 11/2019 |

* cited by examiner

CROSSARM RETROFIT SYSTEM

CROSS-REFERENCE TO PRIOR APPLICATIONS

This application is the U.S. National Phase application under 35 U.S.C. § 371 of International Application No. PCT/EP2022/077451, filed on Oct. 3, 2022, which claims the benefit of both European Patent Application No. 21202193.5, filed on Oct. 12, 2021, and U.S. Provisional Application No. 63/252,404, filed on Oct. 5, 2021. These applications are hereby incorporated by reference herein.

TECHNICAL FIELD

The present disclosure relates generally to elevated lighting arrays, and more particularly to systems, methods, and devices for crossarm retrofit systems for luminaires.

BACKGROUND

Lamps used in applications such as sports lighting often undergo retrofitting. Original systems for these applications use relatively low efficiency high intensity discharge (HID) lamps. Retrofitting these inefficient lamps with lamps that use more efficient technology (e.g., light emitting diodes (LEDs)) can significantly reduce costs and increase performance. The lamps in these systems are typically mounted on a latticed metal frame or other similar type of structure, and they are raised high in the air above any other structure. Also, multiple lamps are mounted in arrays on each frame. These retrofit projects are often expensive and time consuming, in part because mounting the replacement lamps requires new hardware unique for those replacement lamps, and in part because the aim of each replacement lamp needs to be adjusted after almost every install because of the large distance between the replacement lamp and the field or other target that the light from the replacement lamp is directed toward.

U.S. Pat. No. 10,907,810 discloses a mount for attaching light fixtures to a light tower that includes an L-shape stationary portion and a slidably portion that can be clamp with fasteners to mount a light fixture to a light tower. Chinese patent reference CN 213394490 discloses an adjustable clamp for attaching an entertainment light fixture to a cylindrical crossarm.

SUMMARY

In general, in one aspect, the disclosure relates to a crossarm retrofit system for a lamp of a lighting array that includes a crossarm. The crossarm retrofit system can include a crossarm mounting system coupled to the crossarm, wherein the crossarm mounting system comprises a bottom component, a top component, and a coupling assembly, wherein the top component is configured to abut against a top surface of the crossarm, wherein the bottom component is configured to abut against a bottom surface of the crossarm, wherein the coupling assembly is configured to be disposed adjacent to a rear surface of the crossarm, and wherein the coupling assembly is further configured to force the top component and the bottom component to engage and secure the crossarm.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1:
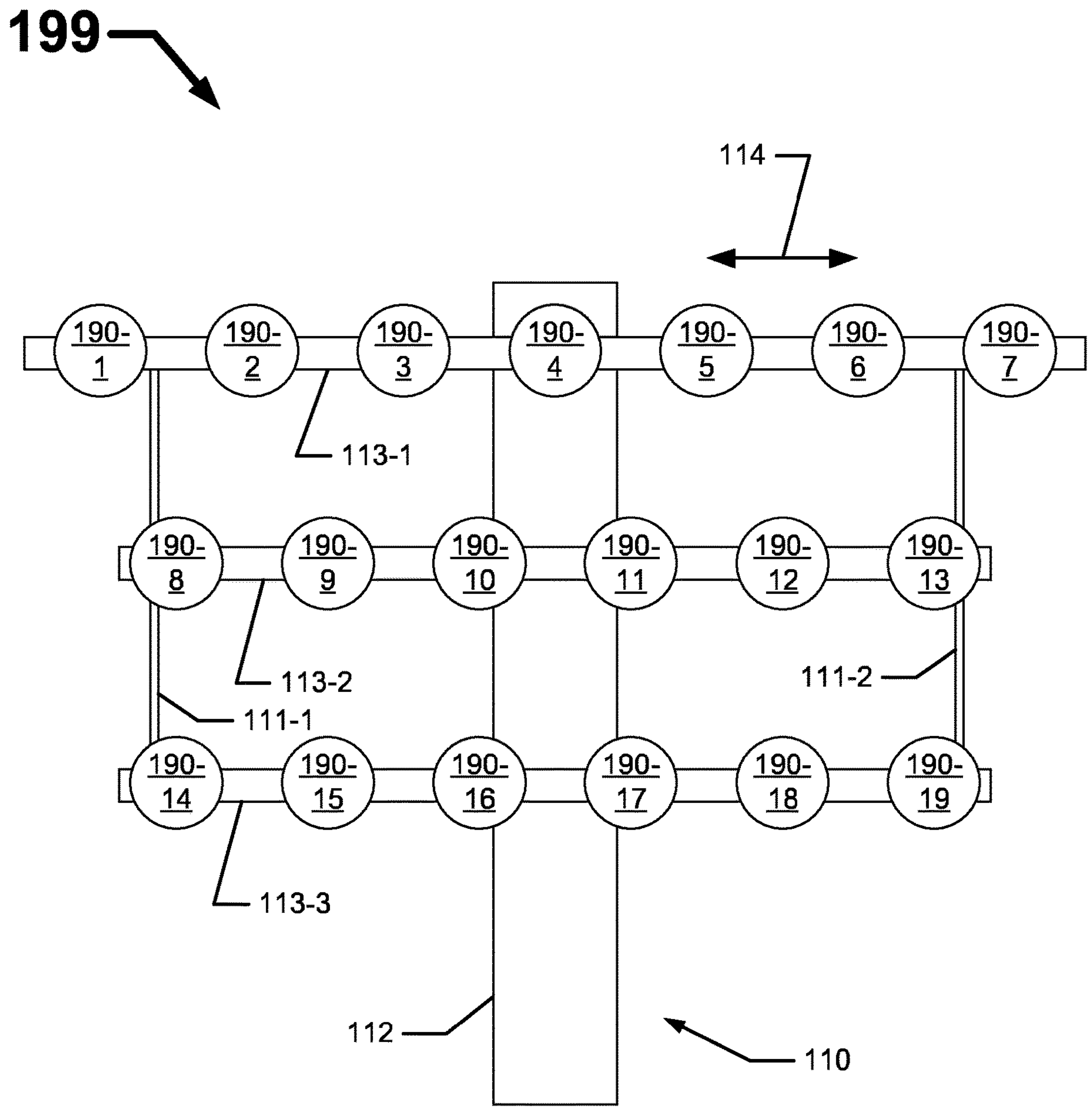
FIG. 1 (Prior Art)
FIG. 1 shows a front view of a lighting array currently used in the art.

In general, example embodiments provide systems, methods, and devices for crossarm retrofit systems. Example embodiments can provide a number of benefits. Such benefits can include, but are not limited to, avoidance of added costs (e.g., installation time, material) for incorrect installation, accurate illumination direction, increased energy efficiency, compliance with industry standards, longevity, and reusability. Example embodiments can be used with new lighting installations or retrofitting existing lighting installations. Example embodiments can be used in any type of lighting application, whether temporary or long-term. Examples of types of such lighting application can include, but are not limited to, sports (e.g., baseball, softball, soccer, golf, tennis, track and field, football) lighting applications, large construction sites, security lighting, and outdoor amphitheaters. A lamp can also be called by any of a number of other names, including but not limited to a luminaire, a light fixture, a lighting module, a lighting engine, and a lighting apparatus.

Crossarm retrofit systems can be located in one or more of any of a number of environments. Examples of such environments can include, but are not limited to, indoors, outdoors, high wind areas, high vibrations areas, high humidity areas, extreme temperature areas, and climatecontrolled areas. In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill.

Crossarm retrofit systems, or portions thereof, can be mounted to a latticed frame that is mounted to any of a number of different structures. Such structures can include, but are not limited to, a pole, an I-beam, a tree, a wall, and a building facade. A user may be any person that interacts with lamps and lighting systems. Examples of a user may include, but are not limited to, an engineer, an electrician, an instrumentation and controls technician, a mechanic, an operator, a property manager, an employee, an installer, a consultant, a contractor, and a manufacturer's representative.

Crossarm retrofit systems (including components thereof) can be made of one or more of a number of suitable materials to allow the lamp coupled thereto to meet certain standards and/or regulations while also maintaining durability in light of the one or more conditions under which the crossarm retrofit systems and/or associated components of the crossarm retrofit systems can be exposed. Examples of such materials can include, but are not limited to, aluminum, stainless steel, fiberglass, glass, plastic, ceramic, and rubber. Such materials can also be configured to effectively function and maintain their structural integrity for long periods of time (e.g., decades) in harsh conditions (e.g., high humidity, high temperatures, low temperatures, high winds, heavy rain).

Example crossarm retrofit systems, or portions thereof, described herein can be made from a single piece (as from a mold, injection mold, die cast, or extrusion process). In addition, or in the alternative, example crossarm retrofit systems (including portions thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, abutting against, in communication with, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example crossarm retrofit system to become coupled, directly or indirectly, to a structure (e.g., a crossarm), a lamp, and/or some other component of the crossarm retrofit system. A coupling feature can include, but is not limited to, a clamp, a portion of a hinge, an aperture, a recessed area, a protrusion, a hole, a slot, a tab, a detent, and mating threads. One portion of an example crossarm retrofit system can be coupled to a structure, a lamp, and/or some other component of the crossarm retrofit system by the direct use of one or more coupling features. Any coupling feature (e.g., an aperture) described herein can have any of a number of shapes (e.g., circular, an arc-shaped slot, a linear slot) and/or sizes.

In addition, or in the alternative, a portion of an example crossarm retrofit system can be coupled to a structure, a lamp, and/or some other component of the crossarm retrofit system using one or more independent devices that interact with one or more coupling features disposed on a component of the crossarm retrofit system. Examples of such devices can include, but are not limited to, a pin, a hinge, a fastening device (e.g., a bolt, a screw, a rivet), epoxy, glue, adhesive, and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing example embodiments of crossarm retrofit systems, one or more of the components shown may be omitted, repeated, and/or substituted. Accordingly, example embodiments of crossarm retrofit systems should not be considered limited to the specific arrangements of components shown in any of the figures. For example, features shown in one or more figures or described with respect to one embodiment can be applied to another embodiment associated with a different figure or description.

In certain example embodiments, crossarm retrofit systems are subject to meeting certain standards and/or requirements. For example, the National Electric Code (NEC), the National Electrical Manufacturers Association (NEMA), the International Electrotechnical Commission (IEC), the Federal Communication Commission (FCC), Underwriters Laboratories (UL), and the Institute of Electrical and Electronics Engineers (IEEE) set standards as to electrical enclosures, wiring, and electrical connections. Use of example embodiments described herein meet (and/or allow the lighting system to meet) such standards when applicable.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number, and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of crossarm retrofit systems will be described more fully hereinafter with reference to the accompanying drawings, in which example embodiments of crossarm retrofit systems are shown. Crossarm retrofit systems may, however, be embodied in many different forms and should not be construed as limited to the example embodiments set forth herein. Rather, these example embodiments are provided so that this disclosure will be thorough and complete, and will fully convey the scope of crossarm retrofit systems to those of ordinary skill in the art. Like, but not necessarily the same, elements (also sometimes called components) in the various figures are denoted by like reference numerals for consistency.

Terms such as “first”, “second”, “above”, “below”, “inner”, “outer”, “distal”, “proximal”, “end”, “top”, “bottom”, “upper”, “lower”, “side”, “left”, “right”, “front”, “rear”, and “within”, when present, are used merely to distinguish one component (or part of a component or state of a component) from another. Such terms are not meant to denote a preference or a particular orientation. Such terms are not meant to limit embodiments of crossarm retrofit systems. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a front view of a lighting array 199 for outdoor sports lighting currently used in the art. The lighting array 199 of FIG. 1 includes a frame 110 and a number of lamps 190 before the lighting array 199 is retrofitted. The frame 110 includes a pole 112, a number of crossarms 113, and a number of vertical supports 111. While there is a single pole 112 in this case, alternative frames 110 can include multiple poles 112. When the frame 110 has multiple poles 112, one pole 112 can have the same or different characteristics (e.mg., height, material, location of apertures, cross-sectional shape) relative to the corresponding characteristics of another pole 112 in the frame 110. The pole 112 is generally vertically oriented, where a portion of the pole 112 toward the top end of the pole 112 is coupled to each of the crossarms 113, and where the bottom end is mounted to some structure (e.g., a wall, the ground, a roof).

The pole 112 can have any of a number of cross-sectional shapes (e.g., circular, square, oval) along some or all of its length. The pole 112 can have any height (e.g., 100 feet, 50 feet) suitable for its purpose. The pole 112 can be made of one or more of any of a number of materials (e.g., stainless steel, aluminum, wood). The pole 112 can have any other features (e.g., tapering, smooth) along its outer surface. The pole 112 has a cavity that runs along a majority of its height. In such a case, one or more electrical cables can be disposed within the cavity. Such electrical cables can be used, for example, for the transfer of power, control, and/or communication signals.

One end of the electrical cables can be connected to one or more of the lamps 190, a junction box, or some other electrical component disposed at or near the top of the pole 112. The other end of the electrical cables can be connected to a junction box, another cable, a control panel, a transformer, or some other electrical component at the bottom of the pole 112 or some location remote from the pole 112. Toward the top end of the pole 112, such as at locations where the crossarms 113 couple to the pole 112, the pole 112 can have one or more apertures (hidden from view) that allow the distal end of one or more electrical cables to traverse therethrough.

The frame can have any of a number of crossarms 113. In this case there are three crossarms 113. Crossarm 113-1 is positioned lowest (closest to the ground). Crossarm 113-3 is positioned at the top. Crossarm 113-2 is positioned between the crossarm 113-1 and crossarm 113-3. In this case, the crossarms 113 are parallel with each other, perpendicular to the pole 112, and equidistant relative to each other. In alternative embodiments, the crossarms 113 can have any other orientation with respect to each other and/or with respect to the pole 112. When the frame 110 has multiple crossarms 113, one crossarm 113 can have the same or different characteristics (e.g., height, material, location of apertures, cross-sectional shape) relative to the corresponding characteristics of another crossarm 113 in the frame 110. In this case, all three crossarms 113 are substantially the same as each other, except that crossarm 113-1 is slightly longer than crossarm 113-2 and crossarm 113-3.

Each crossarm 113 can have any of a number of cross-sectional shapes (e.g., rectangular, circular, square, oval) along some or all of its length. A crossarm 113 can have any length (e.g., 10 feet, 20 feet) suitable for its purpose. A crossarm 113 can be made of one or more of any of a number of materials (e.g., stainless steel, aluminum, wood). A crossarm 113 can have a cavity that runs along a majority of its length. In such a case, one or more electrical cables can be disposed within the cavity. Such cables can be used, for example, for the transfer of power, control, and/or communication signals. These cables can be the same cables described above that are located within the cavity of the pole 112. Alternative, one or more of the cables located in the cavity of a crossarm 113 can be distinct cables that are electrically coupled to one or more of the cables that are located within the cavity of the pole 112.

A crossarm 113 can have any other features (e.g., tapering, smooth) along its outer surface. Each crossarm 113 can have one or more coupling features Each crossarm 113 is configured to have one or more lamps 190 mounted thereto. In this case, lamp 190-1, lamp 190-2, lamp 190-3, lamp 190-4, lamp 190-5, lamp 190-6, and lamp 190-7 are mounted on (coupled to) crossarm 113-1. Lamp 190-8, lamp 190-9, lamp 190-10, lamp 190-11, lamp 190-12, and lamp 190-13 are mounted on (coupled to) crossarm 113-2. Lamp 190-14, lamp 190-115, lamp 190-16, lamp 190-17, lamp 190-18, and lamp 190-19 are mounted on (coupled to) crossarm 113-3.

The frame 110 can optionally include one or more vertical supports 111. The vertical supports 111 are designed to maintain the stability of the frame 110 at its upper end by being couple to multiple crossarms 113. Each vertical support 111 can have any of a number of orientations (e.g., parallel, perpendicular, forming at an acute angle, forming at an obtuse angle) with respect to the pole 112 and/or the crossarms 113. In this case, there are 2 vertical supports 111. Vertical support 111-1 is coupled to crossarm 113-1, crossarm 113-2, and crossarm 113-3 toward their left end. Also, the vertical support 111-1 is oriented parallel to the pole 112 and perpendicular to all three crossarms 113. Vertical support 111-2 is coupled to crossarm 113-1, crossarm 113-2, and crossarm 113-3 toward their right end. Also, the vertical support 111-2 is oriented parallel to the pole 112 and perpendicular to all three crossarms 113.

Each crossarm 113 can have one or more coupling features that allow the crossarm 113 to be directly or indirectly coupled to the pole 112, each vertical support 111, and/or each lamp 190. Similarly, the pole 112, each vertical support 111, and/or each lamp 190 can include one or more coupling features that complement the corresponding coupling features of each crossarm 113. For example, coupling features in the form of apertures that traverse the wall of the pole 112 can be aligned with coupling features in the form of apertures that traverse the wall of a crossarm 113 when the crossarm 113 is placed in a desired position for assembly with respect to the pole 112, and multiple independent coupling features (e.g., bolts) can be inserted through the sets of aligned apertures to couple the crossarm 113 to the pole 112. As another example, vertical support 111-1 and crossarm 113-1 can be welded to each other.

The lamps 190 used at the time that the frame 110 was erected have one or more of a number of deficiencies relative to lamps that can be used today. Examples of such deficiencies can include, but are not limited to, higher operating cost (e.g., less efficient), poor light quality (e.g., sub-optimal lumen output, sub-optimal color, sub-optimal temperature, and lack of reliability. All of the lamps 190 in the lighting array 199 have substantially the same characteristics (e.g., lumen output, lighting technology type, color output, temperature) as each other. Also, the lamps arrayed in a row along each crossarm 113 are separated from each other by a distance 114 in this case.

Figure 2A:
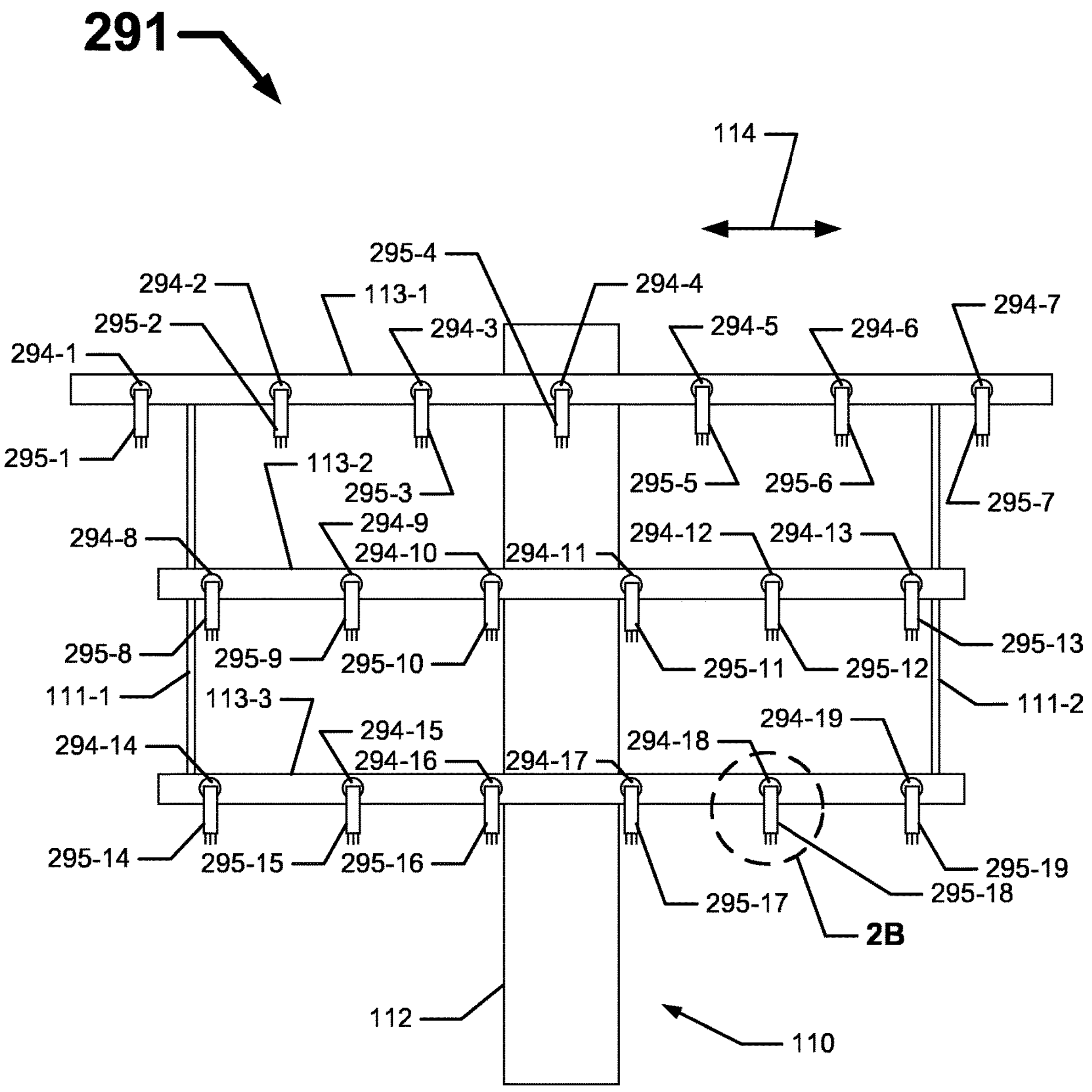
FIGS. 2A and 2B show a lighting array subassembly for mounting retrofit lamps for outdoor sports lighting according to certain example embodiments.
Figure 2B:
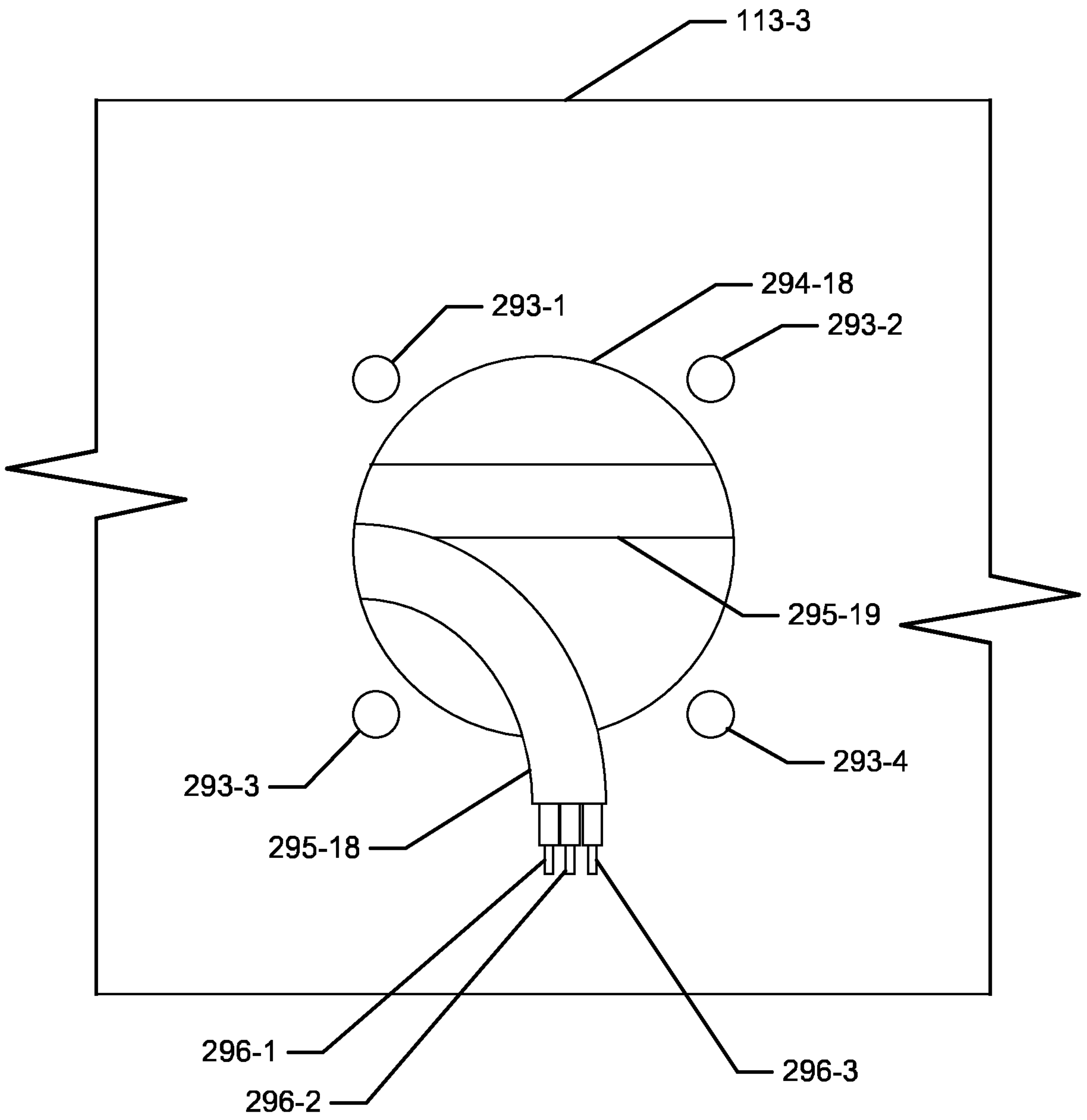

FIGS. 2A and 2B show a lighting array subassembly 291 for mounting retrofit lamps for outdoor sports lighting according to certain example embodiments. Specifically, FIG. 2A shows a front view of the lighting array subassembly 291, and FIG. 2B shows a detailed view of part of the lighting array subassembly 291. Referring to FIGS. 1 through 2B, the lighting array subassembly 291 of FIG. 2A is identical to the system 100 of FIG. 1, except that the lighting array subassembly 291 is without the lamps 190 of FIG. 1 because the lamps 190 are being replaced. As a result, the lighting array subassembly 291 includes the frame 110 of FIG. 1 (including the pole 112, the three crossarms 113, and the two vertical supports 111). The frame 110 in FIG. 2A can be subject to any repairs (e.g., rewelds, changing bolts) that may be performed to ensure continued structural integrity of the frame 110.

The lighting array subassembly 291 in this case also includes a number (in this example, 19) of exposed electrical cables 295 whose distal ends extend through apertures 294 in the crossarms 113. While the apertures 294 are shown to be disposed in the front surface in each crossarm 113, one or more of the apertures 294 can also be disposed in any other surface (e.g., the bottom surface) of a crossarm 113. The distal ends of the electrical cables 295 (discussed above with respect to FIG. 1) are exposed because the lamps 190 of the system 100 of FIG. 1 are removed. There is one electrical cable 295 for each of the lamps 190 that were previously attached to the frame 110, as shown in FIG. 1.

Specifically, with respect to crossarm 113-1, electrical cable 295-1 extends through aperture 294-1 in the front of the crossarm 113-1, electrical cable 295-2 extends through aperture 294-2 in the front of the crossarm 113-1, electrical cable 295-3 extends through aperture 294-3 in the front of the crossarm 113-1, electrical cable 295-4 extends through aperture 294-4 in the front of the crossarm 113-1, electrical cable 295-5 extends through aperture 294-5 in the front of the crossarm 113-1, electrical cable 295-6 extends through aperture 294-6 in the front of the crossarm 113-1, and electrical cable 295-7 extends through aperture 294-7 in the front of the crossarm 113-1.

With respect to crossarm 113-2, electrical cable 295-8 extends through aperture 294-8 in the front of the crossarm 113-2, electrical cable 295-9 extends through aperture 294-9 in the front of the crossarm 113-2, electrical cable 295-10 extends through aperture 294-10 in the front of the crossarm 113-2, electrical cable 295-11 extends through aperture 294-11 in the front of the crossarm 113-2, electrical cable 295-12 extends through aperture 294-12 in the front of the crossarm 113-2, electrical cable 295-13 extends through aperture 294-13 in the front of the crossarm 113-2.

With respect to crossarm 113-3, electrical cable 295-14 extends through aperture 294-14 in the front of the crossarm 113-3, electrical cable 295-15 extends through aperture 294-15 in the front of the crossarm 113-3, electrical cable 295-16 extends through aperture 294-16 in the front of the crossarm 113-3, electrical cable 295-17 extends through aperture 294-17 in the front of the crossarm 113-3, electrical cable 295-18 extends through aperture 294-18 in the front of the crossarm 113-3, electrical cable 295-19 extends through aperture 294-19 in the front of the crossarm 113-3. Adjacent apertures 294 (and so also adjacent electrical cables 295) on each crossarm 113 are separated from each other by the same distance 114 in this case as the distance 114 that separated the lamps 190 in FIG. 1 above.

As shown in the detailed view of FIG. 2B, the aperture 294-18 in crossarm 113-3 (and so also the other apertures 294 in the crossarms 113) is circular and large enough to allow the electrical cable 295-18 to protrude therethrough. Electrical cable 295-19 can also be seen passing behind aperture 294-18 through the cavity within the crossarm 113-3. Surrounding the aperture 294-18 (and so also all other apertures 294) are a number (in this case, four) of coupling features 293. Coupling feature 293-1, coupling feature 293-, coupling feature 293-3, and coupling feature 293-4 are in the form of threaded apertures that are configured to receive an independent coupling feature (not shown) in the form of bolts. While the coupling features 293 in this example have the same characteristics (e.g., shape, size), in alternative embodiments one coupling feature 293 can have at least one characteristic that is different from at least one other coupling feature 293. Also, while the coupling features 293 in this case are spaced equidistantly around and away from the aperture 294-18, in alternative embodiments the coupling features 293 can be configured in any other way around the aperture 294-18.

Each electrical cable 295 can have one or more of a number of electrical conductors 296. For example, in this case, electrical cable 295-18 has three electrical conductors 296 (electrical conductor 296-1, electrical conductor 296-2, and electrical conductor 296-3), which can be for a positive leg, a neutral leg, and a ground. Each electrical conductor can be made of one or more of a number of electrically conductive materials, including but not limited to copper and aluminum. Each conductor 296 and each electrical cable 295 can be surrounded by a jacket made of one or more of a number of electrically non-conductive material, including but not limited to rubber and nylon. An electrical cable 295 with a single electrical conductor 296 can also be called a wire.

Figure 3:
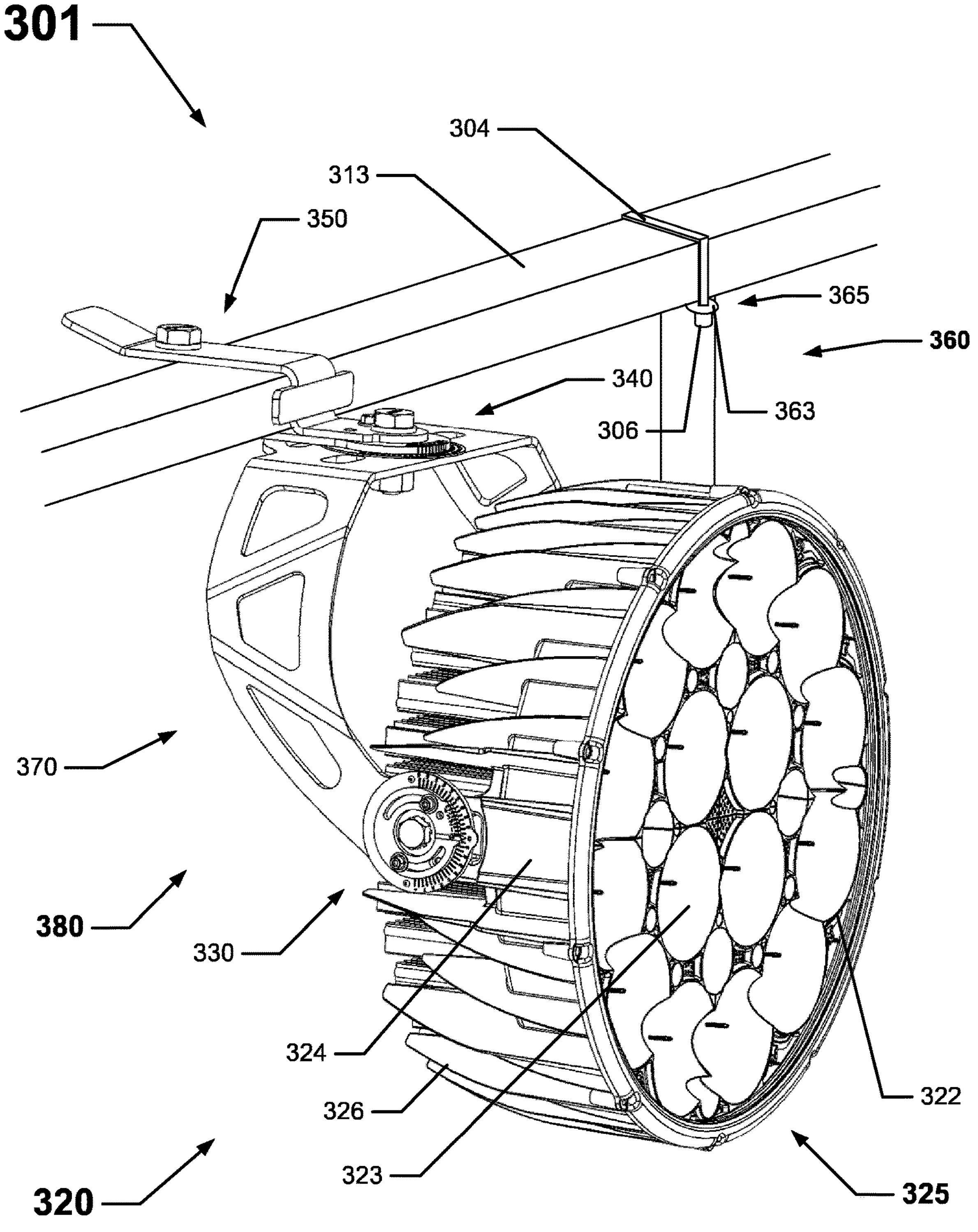
FIG. 3 shows a subassembly that includes a lighting assembly having a crossarm retrofit system according to certain example embodiments.
Figure 4A:
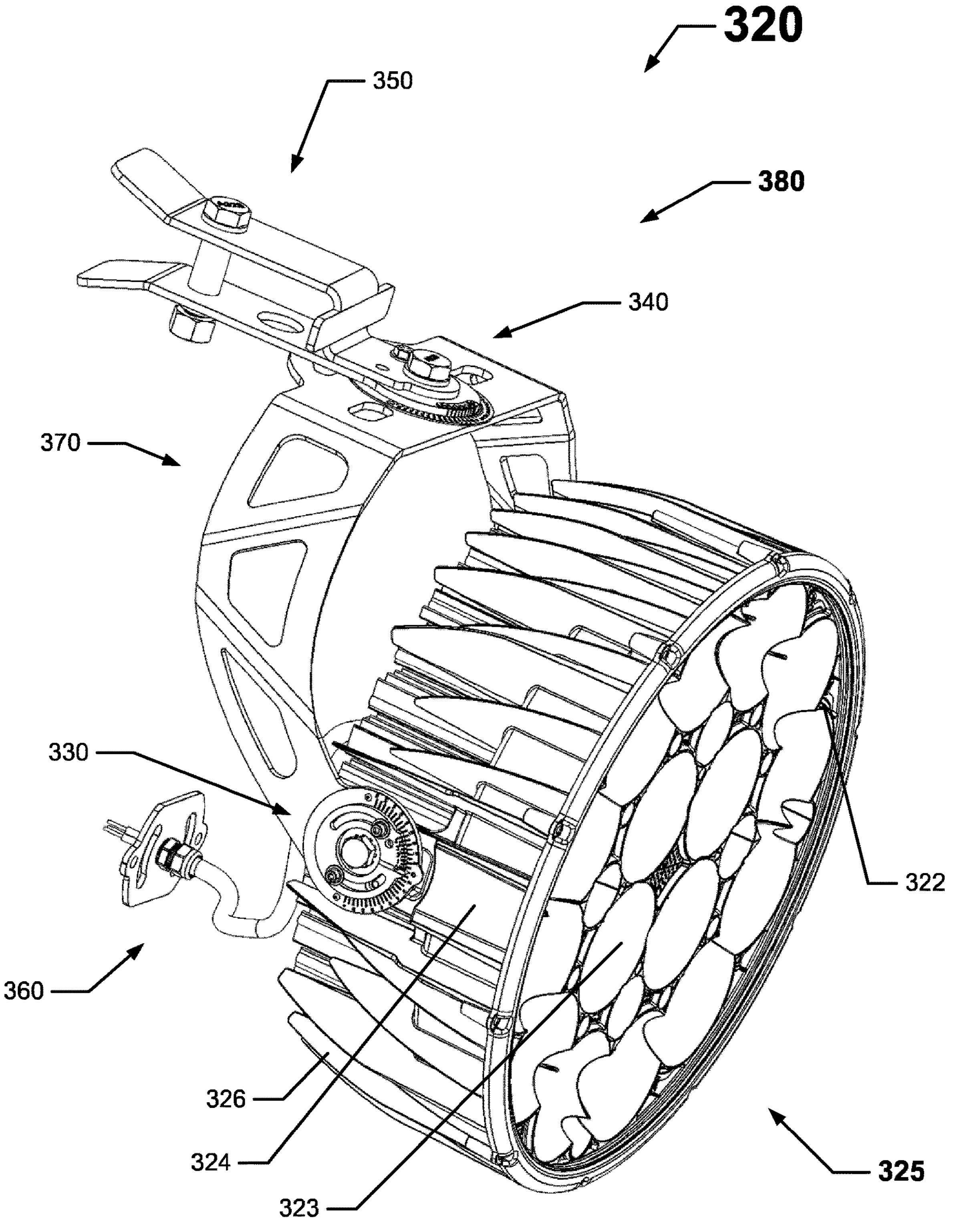
FIGS. 4A and 4B show the lighting assembly of FIG. 3.
Figure 4B:
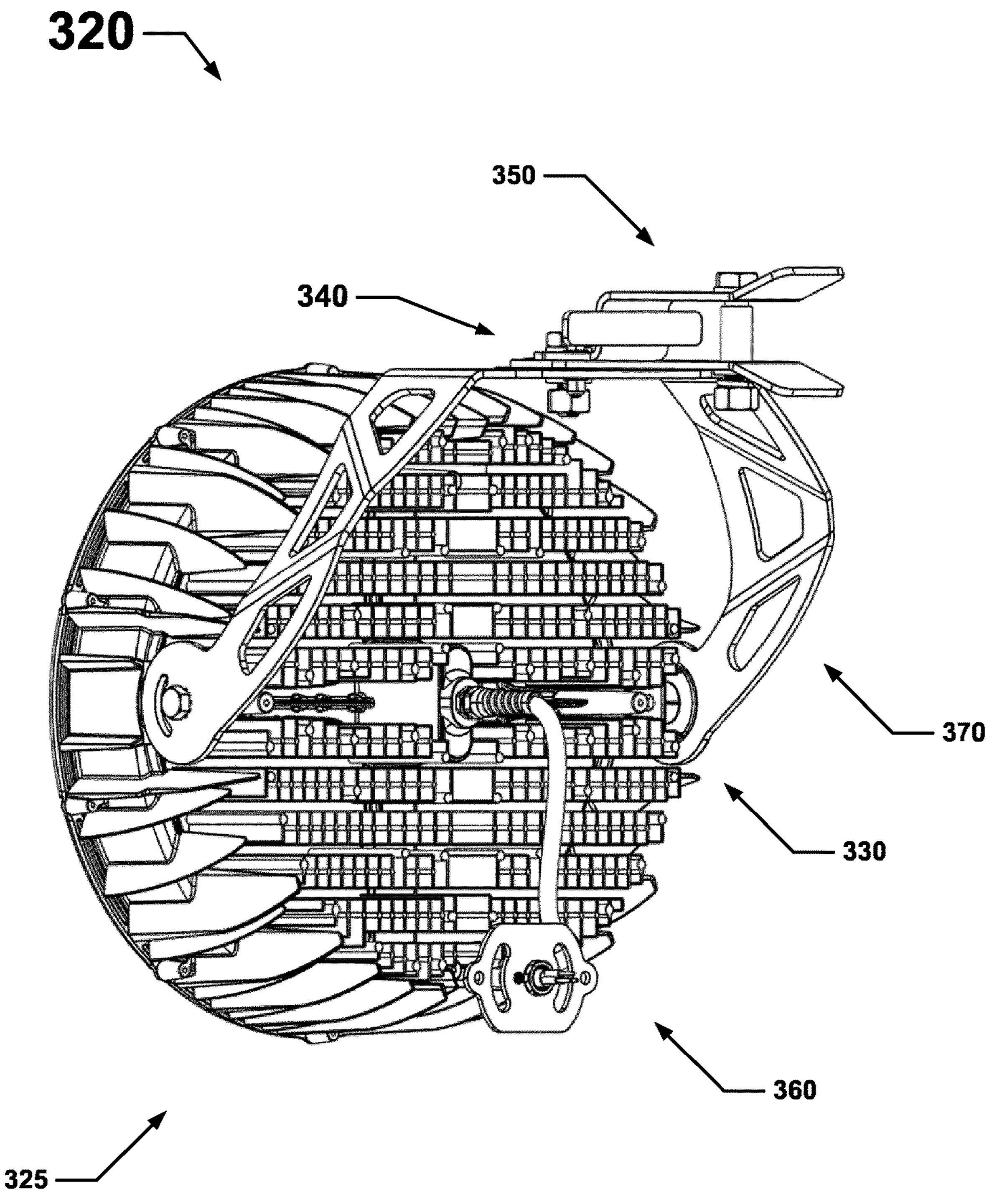

FIG. 3 shows a subassembly 301 that includes a lighting assembly 320 according to example embodiments. FIGS. 4A and 4B show the lighting assembly 320 of FIG. 3. Specifically, FIG. 4A shows a front perspective view of the lighting assembly 320, and FIG. 4B shows a rear perspective view of the lighting assembly 320. Referring to FIGS. 1 through 4B, the subassembly 301 of FIG. 3 shows the lighting assembly 320 coupled to a crossarm 313. The crossarm 313 is substantially the same as the crossarms 113 discussed above, except that in this case the aperture (corresponding to the apertures 294 of FIGS. 2A and 2B) and the electrical cable (corresponding to the electrical cables 295 of FIGS. 2A and 2B) that extends through the aperture are on the bottom surface of the crossarm 313 rather than the front surface, as is the case in FIGS. 1 through 2B above.

The example lighting assembly 320 includes multiple components. For example, in this case, the lighting assembly 320 includes a lamp 325 and an example crossarm retrofit system 380. The crossarm retrofit system 380 also includes multiple components. For example, in this case, the crossarm retrofit system 380 includes at least one tilt adjustment mechanism 330, an orientation adjustment mechanism 340, a crossarm mounting system 350, an electrical interface system 360, and a mounting yoke 370. The lamp 325 of the lighting assembly 320 includes one or more light sources 323 that are more efficient and/or have more capability than the lamps 190. The lamp 325 can also include one or more other components, including but not limited to a housing 324, a heat sink assembly 326, and a lens 322.

Figure 5A:
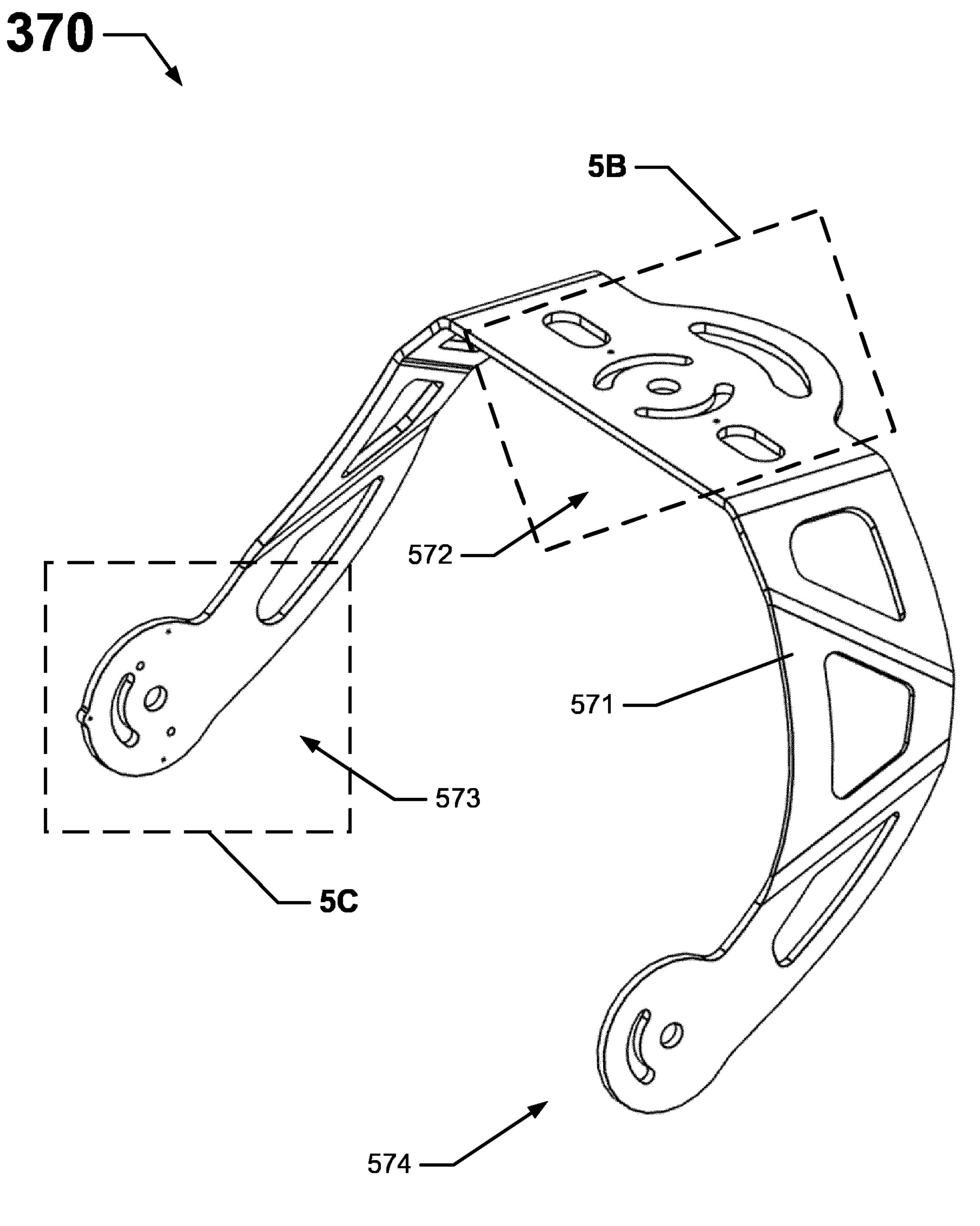
FIGS. 5A through 5C show various views of a mounting yoke of the crossarm retrofit system of FIGS. 3 through 4B.
Figure 5B:
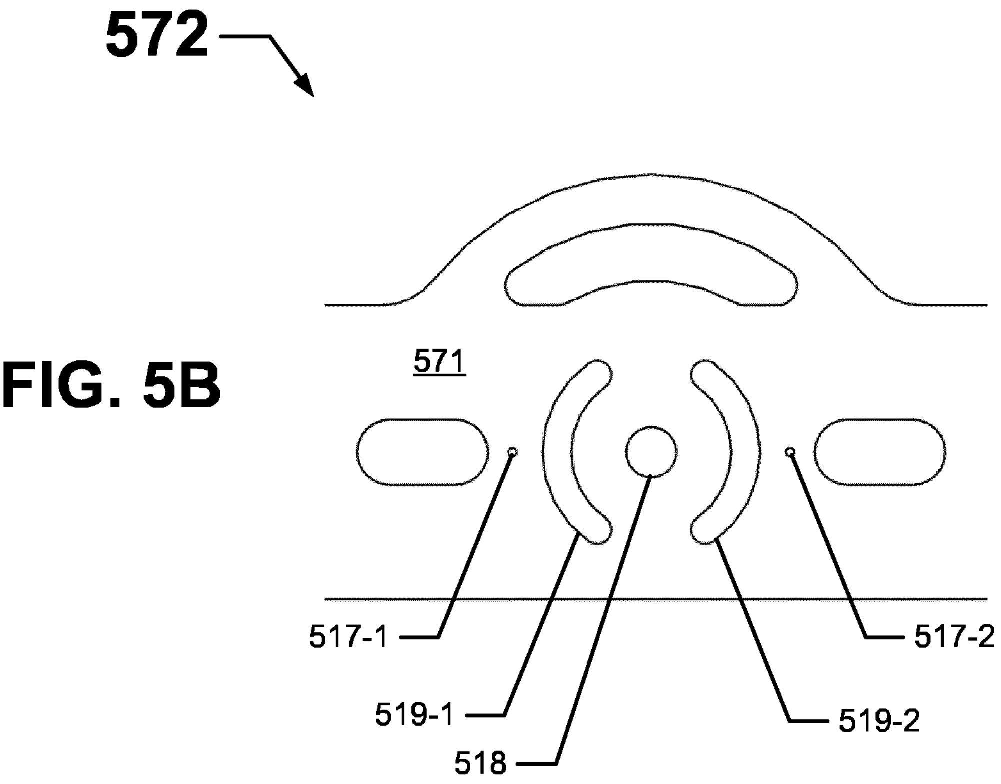
Figure 5C:
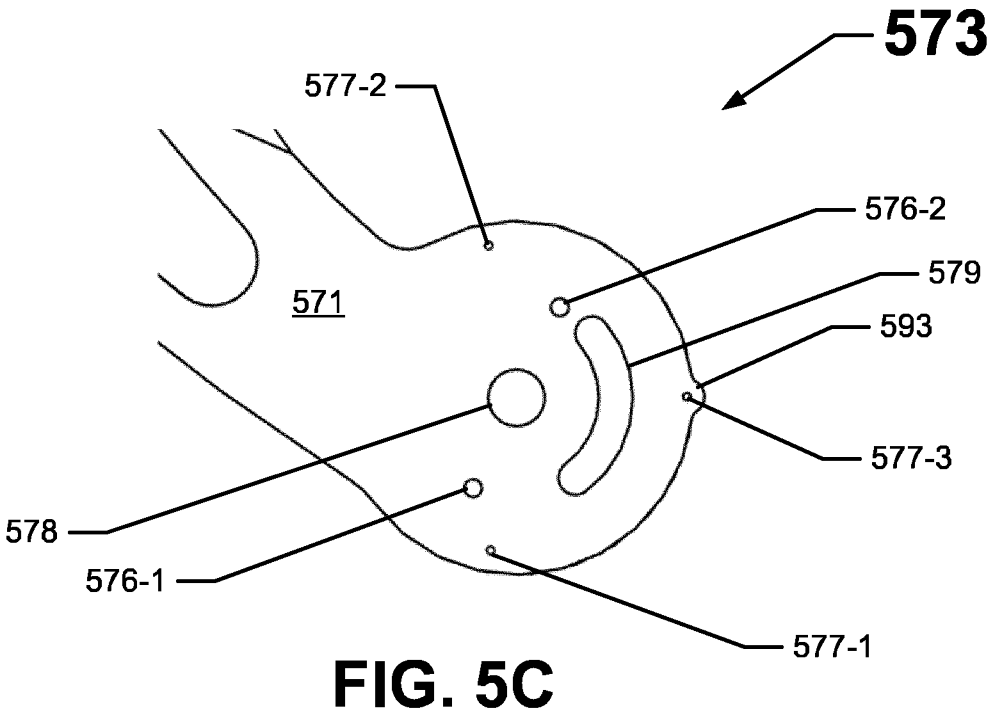

The mounting yoke 370 (also more simply called a yoke 370 herein) of the example crossarm retrofit system 380 is a frame that secures the lamp 325 relative to some other component (e.g., the crossarm mounting system 350) of the subassembly 301. FIGS. 5A through 5C show the yoke 370 of FIGS. 3 through 4B. Specifically, FIG. 5A shows a perspective view of the yoke 370. FIG. 3B shows a detailed view of a middle portion 572 of the yoke 370. FIG. 5C shows a detailed view of a distal end 573 of the yoke 370. Referring to FIGS. 1 through 5C, the yoke 370 has a body 571 that generally forms a U-shape when viewed from the front. In alternative embodiments, the yoke 370 can have any of a number of other general shapes when viewed from the front, including but not limited to semi-circular and semi-oval. The body 371 of the yoke 370 can be made of a rigid material (e.g., stainless steel) that retains the lamp 325 when the yoke 370 is coupled to the crossarm 313 and that maintains its structural integrity (e.g., resists corrosion) over time.

The yoke 370 has multiple portions that each serve one or more purposes. For example, in this case, the yoke 370 has the first distal end 573, a second distal end 574, and the middle portion 572 disposed between the distal end 573 and the distal end 574. The middle portion 572 is configured to couple, directly or indirectly, to the orientation adjustment mechanism 340. The distal end 573 and the distal end 574 are each configured to couple, directly or indirectly, to the housing 324 of the lamp 325. The distal end 573 and/or the distal end 574 can also be configured to couple, directly or indirectly, to a tilt adjustment mechanism 330.

The middle portion 572 of the yoke 370 in this case is located halfway between the distal end 573 and the distal end 574. In alternative embodiments the middle portion 572 can be positioned at any other point between the distal end 573 and the distal end 574. The middle portion 572 of the yoke 370 can include one or more coupling features that can be located at various places with respect to the body 571 at the middle portion 572. For example, in this case, the middle portion 572 of the yoke 370 can include a coupling feature 518, one or more coupling features 519, and one or more coupling features 517.

In this case, as shown in FIG. 5B, the coupling feature 518 is in the form of a circular aperture that traverses the body 571 of the yoke 370. Also, there are two coupling features 519 (coupling feature 519-1 and coupling feature 519-2) in the form of curved slots that traverse the body 571 and are symmetrically disposed around the coupling feature 518. Finally, there are two coupling features 517 (coupling feature 517-1 and coupling feature 517-2) in the form of circular apertures (smaller than the size of the coupling feature 518) that traverse the body 571 and are symmetrically disposed around the coupling feature 518. The coupling features 517 are positioned further away from the coupling feature 518 compared to the coupling features 519.

The body 571 of the yoke at the distal end 573 is substantially circular in shape. The distal end 573 of the yoke 370 can include one or more coupling features that can be located at various places with respect to the body 571 at the distal end 573. For example, in this case, the distal end 573 of the yoke 370 can include a coupling feature 578, a coupling features 579, one or more coupling features 576, and one or more coupling features 577. In this case, as shown in FIG. 5C, the coupling feature 578 is in the form of a circular aperture that traverses the body 571 in the approximate center of the distal end 573 of the yoke 370. The coupling feature 579 is in the form of a curved slot that traverses the body 571 adjacent to the coupling feature 578 and is positioned approximately halfway between the coupling feature 578 and the outer perimeter of the distal end 573.

There are two coupling features 576 (coupling feature 576-1 and coupling feature 576-2) in the form of circular apertures that traverse the body 571 of the yoke 370. The coupling features 576 are symmetrically disposed around the coupling feature 578 at substantially the same radius from the coupling feature 578 as the coupling feature 579. Coupling feature 576-1 is positioned further away from coupling feature 578 than coupling feature 576-2.

Finally, there are three coupling features 577 (coupling feature 577-1, coupling feature 577-2, and coupling feature 577-3) in the form of circular apertures (smaller than the size of the coupling features 576) that traverse the body 571 and are located proximate to the outer perimeter of the body 571 at substantially the same distance from the coupling feature 578. The coupling features 517 are positioned further away from the coupling feature 578 compared to the coupling features 576 and the coupling feature 579. The location of coupling feature 577-3 on the body 571 coincides with a slight protrusion 593 along the outer perimeter of the body 571 at the distal end 573.

The distal end 574 of the yoke 370 can have the same or a different configuration compared to the configuration of the distal end 573. For example, in this case, the outer perimeter of the distal end 574 lacks any type of protrusion, such as the protrusion 593 of the distal end 573. Otherwise, the shape and size of the distal end 574 is substantially the same as the shape and size of the distal end 573. As another example, the distal end 574 lacks any coupling features that correspond to the coupling features 576 and the coupling features 577 of the distal end 573. The lack of such coupling features on the distal end 574 indicates that there is no tilt adjustment mechanism (e.g., tilt adjustment mechanism 330) that engages with the distal end 574. In terms of similarities between the distal end 574 and the distal end 573, the distal end 574 has coupling features that correspond to the shape, size, and configuration of the coupling feature 578 and the coupling feature 579 of the distal end 573.

Figure 6A:
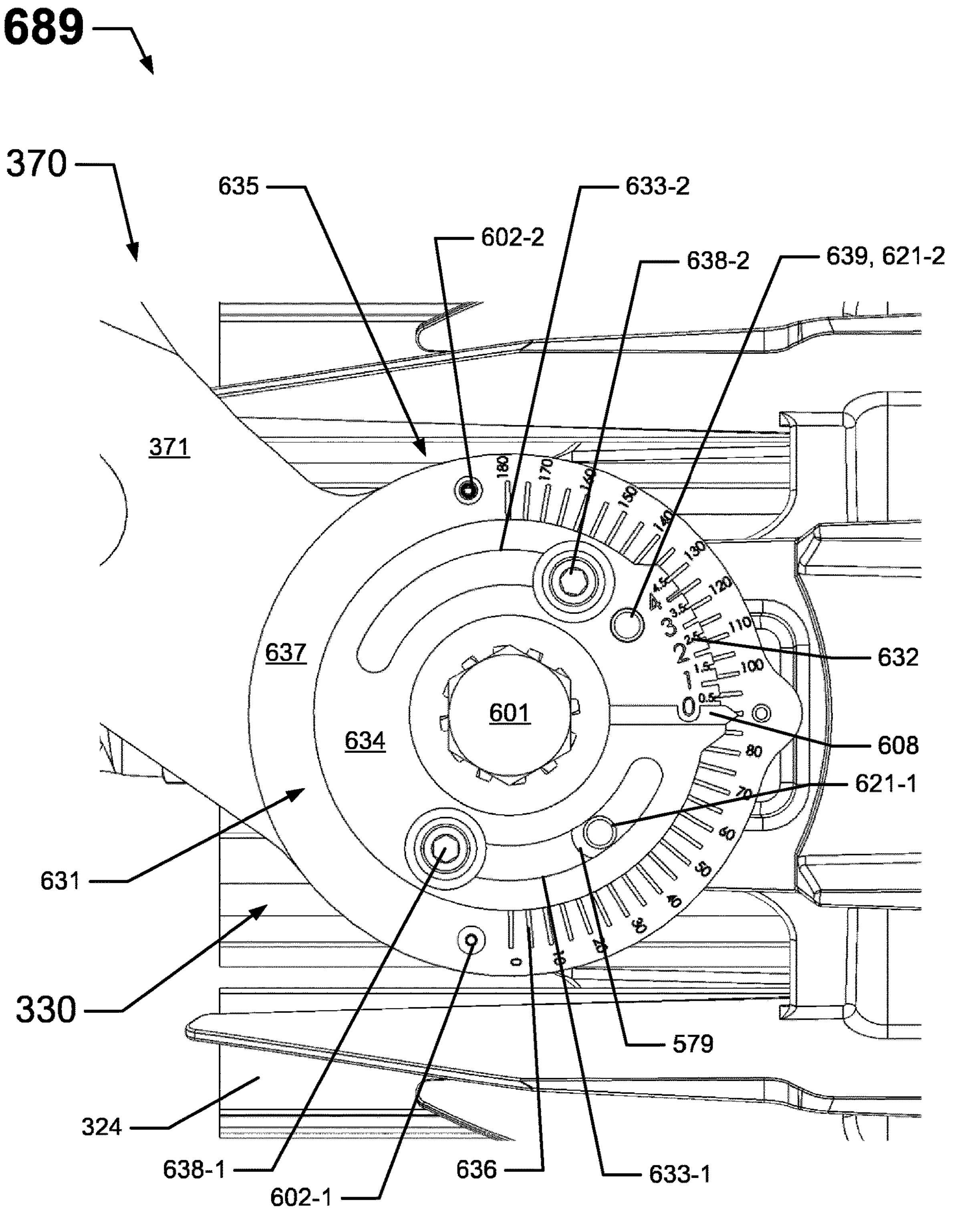
FIGS. 6A and 6B show various views of a tilt adjustment mechanism of the crossarm retrofit system of FIGS. 3 through 4B.
Figure 6B:
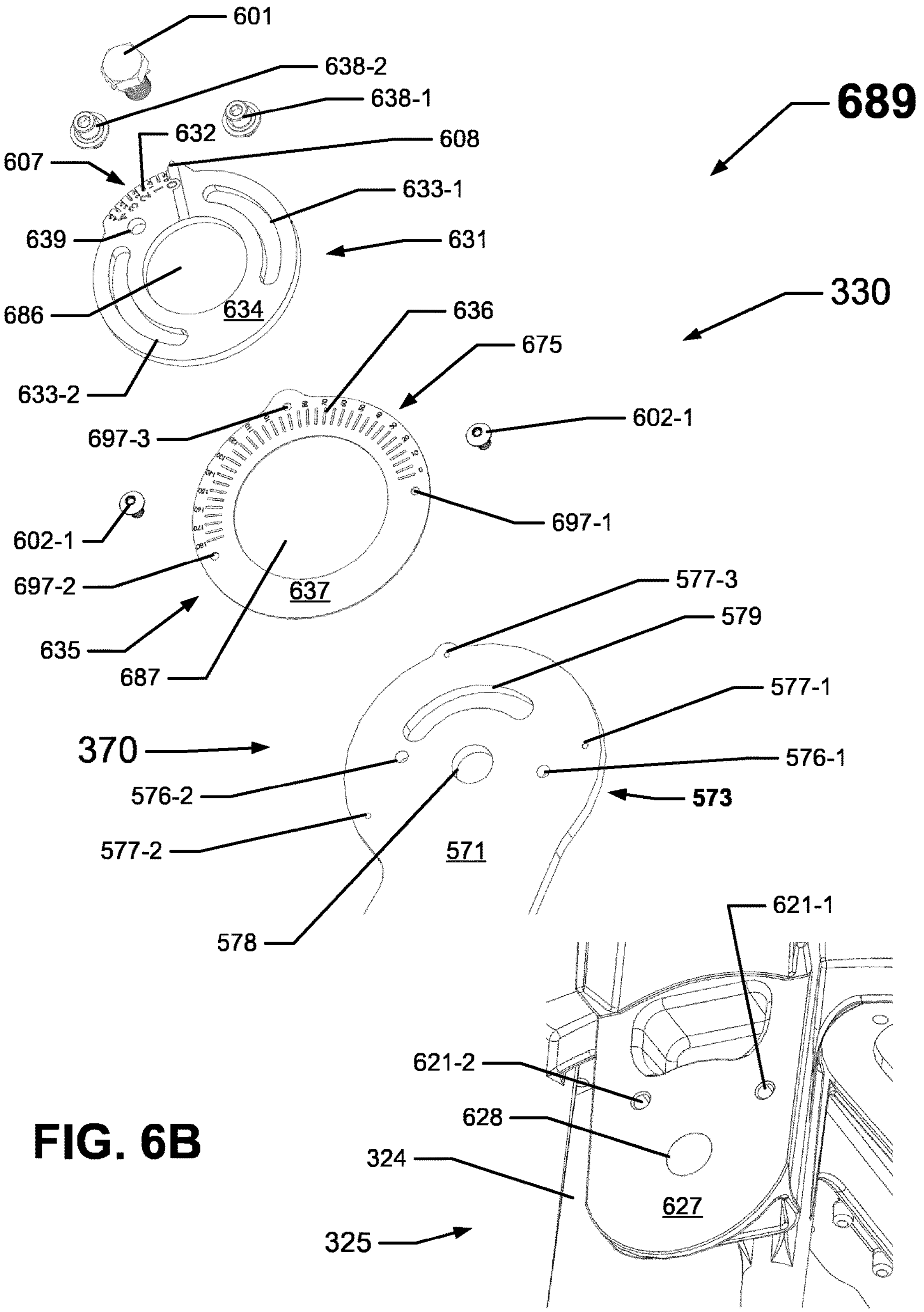

The tilt adjustment mechanism 330 of the example crossarm retrofit system 380 is configured to set and maintain a precise tilt angle for the lamp 325. An example of a tilt adjustment mechanism 330 is shown in FIGS. 6A and 6B. Specifically, FIG. 6A shows a side view of a subassembly 589 that includes the tilt adjustment mechanism 330. FIG. 6B shows an exploded view of the subassembly 589. Referring to FIGS. 1 through 6B, in addition to the tilt adjustment mechanism 330, the subassembly 589 of FIGS. 6A and 6B shows part of the left side of the housing 324 of the lamp 325 and the distal end 573 of the yoke 370.

The tilt adjustment mechanism 330 is configured to set and maintain a precise amount of tilt that the lamp 325 has relative to a horizontal plane. In applications for which example crossarm retrofit systems (e.g., crossarm retrofit system 380) can be used, the lamp 325 is located a great distance (e.g., hundreds of feet) from the objects (e.g., a field of play) that are illuminated by the lamp 325. Also, when example crossarm retrofit systems (e.g., crossarm retrofit system 380) are used, the associated lamps 325 are installed in a location (e.g., dozens of yards in the air) that is difficult to reach without special equipment (e.g., a bucket lift). As a result, the tilt angle (which can be set by the tilt adjustment mechanism 330) and the orientation angle (which can be set by the orientation adjustment mechanism 340) of the lamp 325 must be set precisely in order to shorten the installation period and to reduce the need for adjusting those settings at a later time.

The tilt adjustment mechanism 330 can include one or more components and/or features. In this case, the tilt adjustment mechanism 330 includes a tilt adjustment plate 631 that is rotatably coupled to the distal end 573 of the yoke 370 and a large-scale vernier component 635. The tilt adjustment plate 631 can include multiple features and/or coupling features. For example, in this case, the tilt adjustment plate 631 has a body 634 that is substantially circular in shape. Disposed on the body 634 of the tilt adjustment plate 631 can be a small-scale vernier 607 and a reference line 608. The reference line 608 is used to set the tilt angle of the lamp 325 by pointing to a number on the large-scale vernier 675 of the large-scale vernier component 635. The small-scale vernier 607 shows tilt angles from 0° to 4.5° in increments 632 of 0.5°. The small-scale vernier 607 provides half degree refinement within the 5° increments 636 in the large-scale vernier 675, discussed below.

The small-scale vernier 607 and/or the reference line 608 can be etched into the body 634 of the tilt adjustment plate 631. Alternatively, the small-scale vernier 607 and/or the reference line 608 can be painted on the body 634 of the tilt adjustment plate 631. As yet another alternative, the small-scale vernier 607 and/or the reference line 608 can be separate components that are coupled to (e.g., adhered to, riveted to, screwed to) the body 634 of the tilt adjustment plate 631. The tilt adjustment plate 631 also has an aperture 686 that traverses therethrough, where the center of the aperture 686 is coincident with the approximate center of the tilt adjustment plate 631.

In addition, the tilt adjustment plate 631 can include one or more coupling features. For example, in this case, the body 634 of the tilt adjustment plate 631 includes a coupling feature 639 and one or more coupling features 633. In this case, as shown in FIG. 6B, the coupling feature 639 is in the form of a circular aperture that traverses the body 634 of the tilt adjustment plate 631. Also, there are two coupling features 633 (coupling feature 633-1 and coupling feature 633-2) in the form of curved slots that traverse the body 634 and are symmetrically disposed around the aperture 686. The coupling feature 639 is located at the same radius from the center of the aperture 686 as the coupling features 633 and is also located adjacent to the small-scale vernier 607 between coupling feature 633-2 and the reference line 608.

The large-scale vernier component 635 in this case is a separate component of the tilt adjustment mechanism 330. The large-scale vernier component 635 has a body 637 that is substantially circular in shape and on which the large-scale vernier 675 is disposed (e.g., etched on, adhered to, coupled to). The shape and size of the large-scale vernier component 635 can be substantially the same as the shape and size of the body 571 of the distal end 573 of the yoke 370. The large-scale vernier component 635 also has an aperture 687 that traverses therethrough, where the center of the aperture 687 is coincident with the approximate center of the large-scale vernier component 635. The large-scale vernier component 635 can include one or more (in this case, three) coupling features 697 (in this case, coupling feature 697-1, coupling feature 697-2, and coupling feature 697-3). The coupling features 697 in this example are in the form of apertures that traverse the body 637 of the large-scale vernier component 635 and are aligned with the coupling features 577 of the distal end 573 of the yoke 370.

The large-scale vernier component 635 is coupled, directly or indirectly, to the body 571 of the distal end 573 of the yoke 370. In this example, the large-scale vernier component 635 is indirectly coupled to the body 571 of the distal end 573 of the yoke 370 using one or more (in this case, two) coupling features 602 (coupling feature 602-1 and coupling feature 602-2). The coupling features 602 are in the form of rivets. Coupling feature 602-1 is disposed in coupling feature 697-1 of the large-scale vernier component 635 and in coupling feature 577-1 of the distal end 573 of the yoke 370. In alternative embodiments, the large scale vernier component 635 can be a separate component that is coupled to the tilt adjustment plate 631. Coupling feature 602-2 is disposed in coupling feature 697-2 of the large-scale vernier component 635 and in coupling feature 577-2 of the distal end 573 of the yoke 370.

In alternative embodiments, the large scale vernier component 635 can be a separate component that is coupled to the tilt adjustment plate 631. In other alternative embodiments, the large scale vernier component 635 can be integrated with (e.g., printed on, etched on) the body 571 of the distal end 573 of the yoke 370. As discussed above, the large-scale vernier 675 of the large-scale vernier component 635 has 5° increments 636, ranging in this case from 0° to 180°. The range and/or the size of the increments 636 of the large-scale vernier 675 and/or the increments 632 of the small-scale vernier 607 can vary in alternative embodiments, provided that the size of the increments 636 of the large-scale vernier 675 is larger than the size of the increments 632 of the small-scale vernier 607.

The housing 324 of the lamp 325 can include one or more mounting features 627, where each mounting feature 627 is configured to receive a distal end (e.g., distal end 573) of the yoke 370. A distal end of the yoke 370 can be directly or indirectly coupled to a mounting feature 627. In certain example embodiments, the yoke 370 and the lamp 325 can be rotatably coupled to each other. Each mounting feature 627 can have a surface that complements the inner surface of the body 571 of the distal end. For example, in this case, the mounting surface 627 is planar and extends away from the rest of the housing 324 so that the lamp 325 and the distal end (e.g., distal end 573) of the yoke 370 can rotate freely with respect to each other.

As shown in FIG. 6B, the mounting feature 627 can include one or more of a number of features. For example, the mounting feature 627 can have a coupling feature 628, in this case in the form of an aperture, disposed therein. The coupling feature 628 of the mounting feature 627 can be aligned with the coupling feature 578 of the distal end 573 of the yoke 370. Coupling feature 601, in this case in the form of a screw, can be disposed in the coupling feature 628 and the coupling feature 578. In certain example embodiments, one or more additional features (e.g., a housing with bearings) can be disposed on the rear side of the mounting feature 627 to allow for some degree of rotation between the lamp 325 and the yoke 370. As another example, the mounting feature 627 can include one or more (in this case, two) other coupling features 621 (coupling feature 621-1 and coupling feature 621-2), also in the form of apertures.

In certain example embodiments, the tilt adjustment plate 631 is rotatably coupled, directly or indirectly, to the distal end 573 of the yoke 370. In this case, two coupling features 638 are disposed in the coupling features 633 of the tilt adjustment plate 631 and in the coupling features 576 in the body 571 of the distal end 573 of the yoke 370. Specifically, coupling feature 638-1 is disposed in the coupling feature 633-1 of the tilt adjustment plate 631 and in the coupling feature 576-1 in the body 571 of the distal end 573 of the yoke 370. Also, coupling feature 638-2 is disposed in the coupling feature 633-2 of the tilt adjustment plate 631 and in the coupling feature 576-2 in the body 571 of the distal end 573 of the yoke 370.

When one or both of the coupling features 638 are completely tightened down (e.g., using another independent coupling feature such as a nut, hidden from view), the tilt adjustment plate 631 and the distal end 573 of the yoke 370 remain in a fixed position with respect to each other. When the coupling features 638 are loosened while still remaining engaged with their respective coupling features 633 and coupling features 576, the tilt adjustment plate 631 and the distal end 573 of the yoke 370 can be rotated with respect to each other. In this latter case, fine tuning of the tile angle can be performed by utilizing the large-scale vernier 675 and the small-scale vernier 607.

In certain example embodiments, a locking mechanism (e.g., a retractable pin, a screw) (not shown, but known to those of ordinary skill in the art) can be used to fix the tilt adjustment mechanism 330 in place. For example, such a locking mechanism can engage coupling feature 639 of the tilt adjustment plate 631, the coupling feature 579 of the distal end 573 of the yoke 370, and a coupling feature 621 (e.g., coupling feature 621-2) disposed in the mounting feature 627 of the housing 324 of the lamp 325.

Figure 7A:
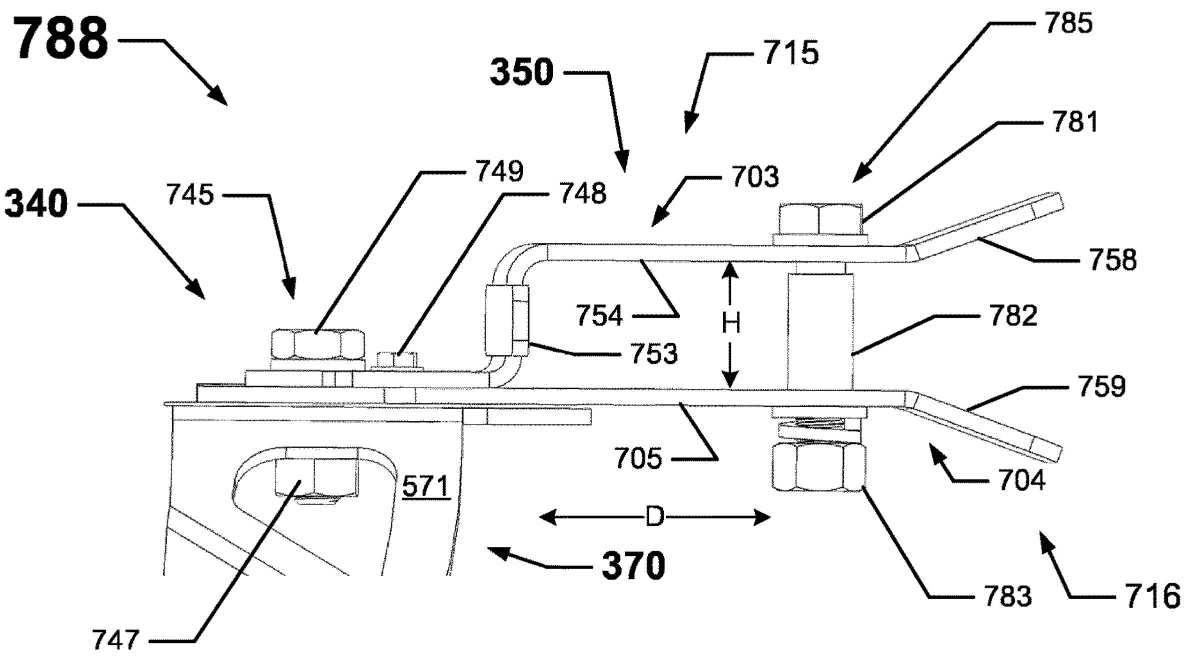
FIGS. 7A and 7B show various views of the orientation adjustment mechanism and the crossarm mounting system of the crossarm retrofit system of FIGS. 3 through 4B.
Figure 7B:
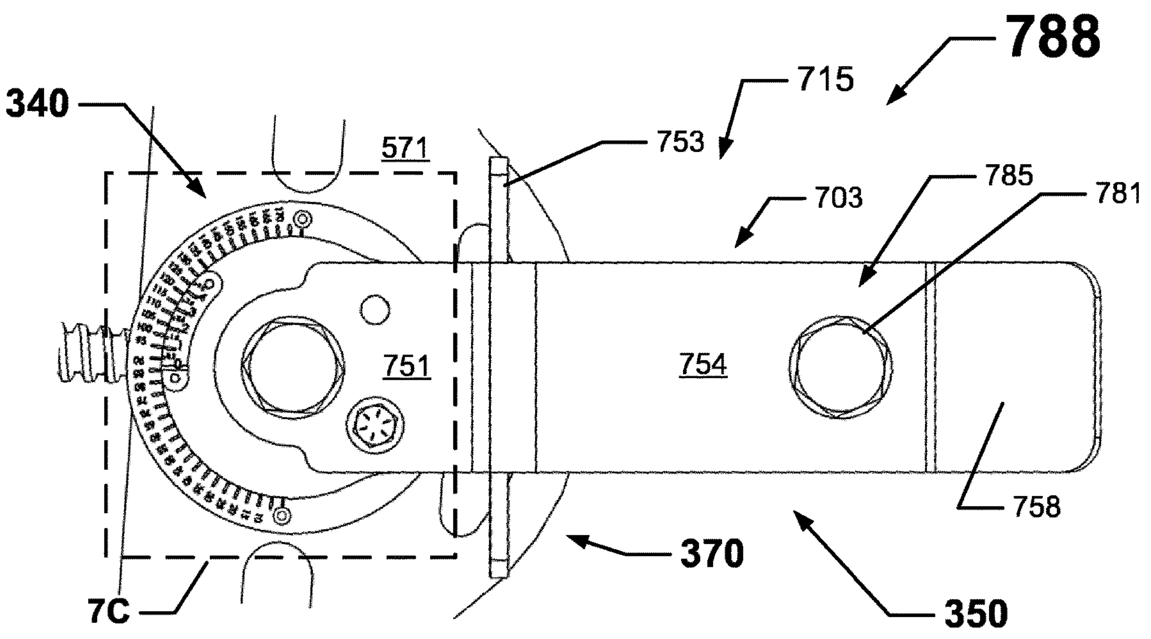
Figure 7C:
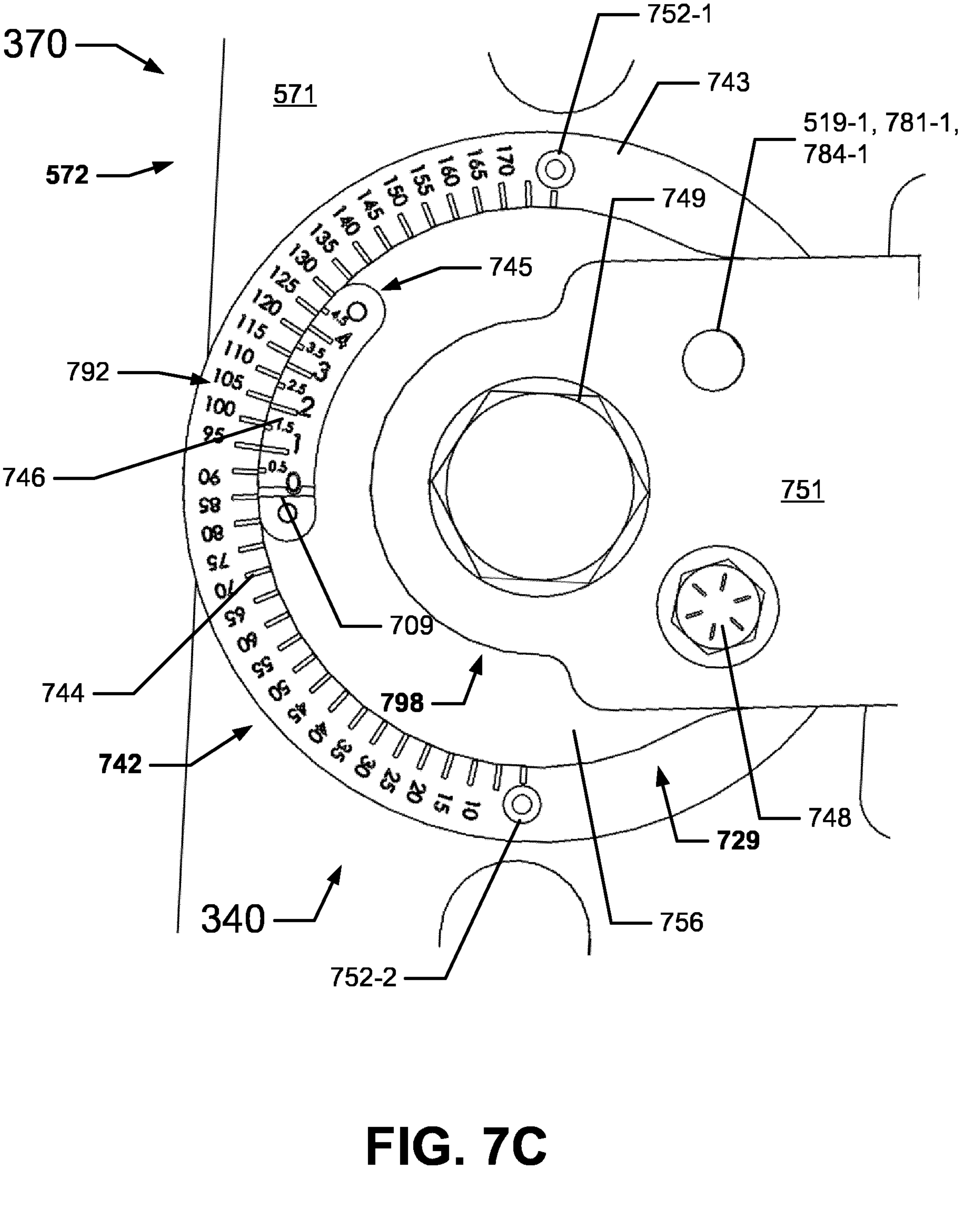
FIG. 7C shows a front view of the orientation adjustment mechanism of the crossarm retrofit system of FIGS. 7A and 7B.
Figure 7D:
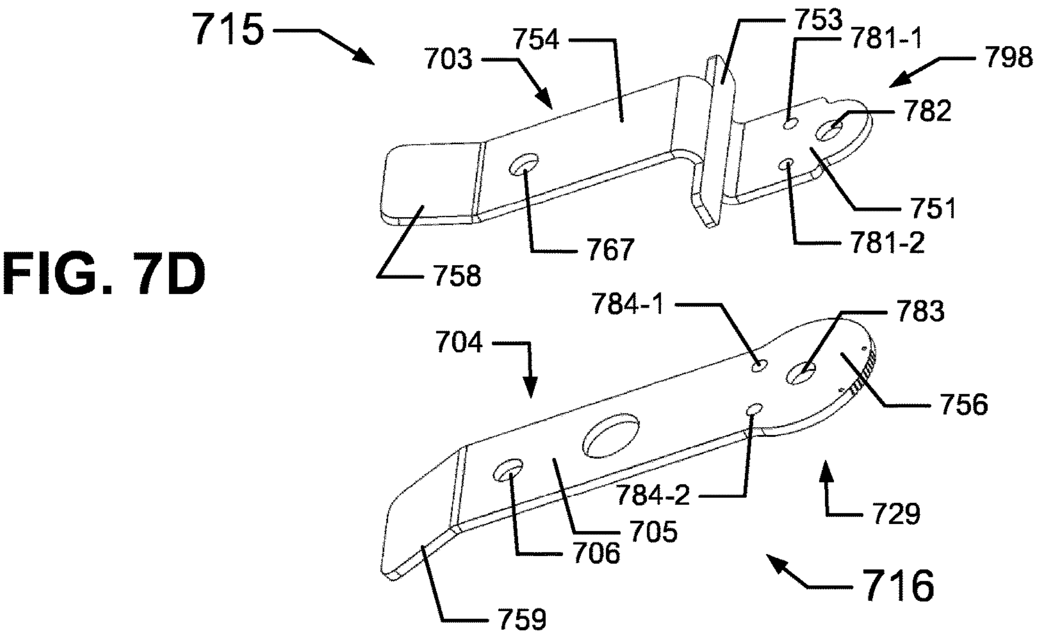
FIG. 7D shows a perspective view of multiple components of the orientation adjustment mechanism and the crossarm mounting system of FIGS. 7A through 7C.

The orientation adjustment mechanism 340 (also known as a pan adjustment mechanism 340) of the example crossarm retrofit system 380 is configured to set and maintain a precise orientation angle (also known as a pan angle) for the lamp 325. An example of an orientation adjustment mechanism 340 is shown in FIGS. 7A through 7D. Specifically, FIG. 7A shows a side view of a subassembly 788 that includes the orientation adjustment mechanism 340 according to certain example embodiments. FIG. 7B shows a top view of the subassembly 788. FIG. 7C shows a detailed view of the orientation adjustment mechanism 340 of FIG. 7B. FIG. 7D shows a perspective view of the component 715 and the component 716 of FIGS. 7A through 7C. Referring to FIGS. 1 through 7D, in addition to the orientation adjustment mechanism 340, the subassembly 788 of FIGS. 7A through 7C shows the crossarm mounting system 350 and part of the middle portion 572 of the yoke 370. The orientation adjustment mechanism 340 is configured to set and maintain a precise orientation that the lamp 325 has relative to a vertical plane. The rationale stated above as to the importance of correctly setting and holding the tile angle of the lamp 325 applies equally to setting and holding the orientation angle of the lamp 325.

The orientation adjustment mechanism 340 can include one or more components and/or features. In this case, the orientation adjustment mechanism 340 includes an orientation adjustment plate 729 (also known as a pan adjustment plate 729) that is rotatably coupled to the middle portion 572 of the yoke 370 and a large-scale vernier component 742. The orientation adjustment plate 729 can be a stand-alone component or, as in this case, can be part of a component 716 that is also used for the crossarm mounting system 350. The orientation adjustment plate 729 can include multiple features and/or coupling features. For example, in this case, the orientation adjustment plate 729 has a body 756 that is planar and substantially circular in shape, but in alternative embodiments the body 756 can have any of a number of other suitable shapes (e.g., oval, square) when viewed from above. Disposed on the body 756 of the orientation adjustment plate 729 can be a small-scale vernier 745 and a reference line 709. The reference line 709 is used to set the orientation angle of the lamp 325 by pointing to a number on the large-scale vernier 792 disposed on the large-scale vernier component 742, discussed below. The small-scale vernier 745 shows orientation angles from 0° to 4.5° in increments 746 of 0.5°. The small-scale vernier 745 provides half degree refinement within the 5° increments 636 in the large-scale vernier 792 of the large-scale vernier component 742.

The small-scale vernier 745 and/or the reference line 709 can be etched into the body 756 of the orientation adjustment plate 729. Alternatively, the small-scale vernier 745 and/or the reference line 709 can be painted on the body 756 of the orientation adjustment plate 729. As yet another alternative, the small-scale vernier 745 and/or the reference line 709 can be separate components that are coupled to (e.g., adhered to, riveted to, screwed to) the body 756 of the orientation adjustment plate 729.

In addition, the orientation adjustment plate 729 can include one or more coupling features. For example, in this case, the body 756 of the orientation adjustment plate 729 includes a coupling feature 783 and one or more coupling features 784. In this case, as shown in FIG. 7D, the coupling feature 783 is in the form of a circular aperture that traverses the body 756 of the orientation adjustment plate 729, where the center of the coupling feature 783 is coincident with the approximate center of the orientation adjustment plate 729. Also, there are two coupling features 784 (coupling feature 784-1 and coupling feature 784-2) in the form of circular apertures that traverse the body 756 and are disposed toward a distal portion of the orientation adjustment plate 729.

The large-scale vernier component 742 in this case is a separate component of the orientation adjustment mechanism 340. The large-scale vernier component 742 has a body 743 that is planar and substantially circular in shape. The large-scale vernier 792 is disposed on (e.g., coupled to, etched on) a top surface of the large-scale vernier component 742. The shape and size of the large-scale vernier component 742 can be substantially the same shape and have a larger size compared to the shape and size of the orientation adjustment plate 729. The large-scale vernier component 742 can include one or more (in this case, two) coupling features (hidden from view) in the form of apertures that traverse the body 743 of the large-scale vernier component 742 and are aligned with the coupling features 517 of the middle portion 572 of the yoke 370.

The large-scale vernier component 742 is coupled, directly or indirectly, to the body 571 of the middle portion 572 of the yoke 370. In this example, the large-scale vernier component 742 is indirectly coupled to the body 571 of the middle portion 572 of the yoke 370 using one or more (in this case, two) coupling features 752 (coupling feature 752-1 and coupling feature 752-2). The coupling features 752 are in the form of rivets in this case. Coupling feature 752-1 is disposed in a coupling feature of the large-scale vernier component 742 and in coupling feature 517-1 of the middle portion 572 of the yoke 370. Coupling feature 752-2 is disposed in another coupling feature of the large-scale vernier component 742 and in coupling feature 517-2 of the middle portion 572 of the yoke 370.

In alternative embodiments, the large scale vernier component 742 can be a separate component that is coupled to the orientation adjustment plate 729. In other alternative embodiments, the large scale vernier component 742 can be integrated with (e.g., printed on, etched on) the body 571 of the middle portion 572 of the yoke 370. As discussed above, the large-scale vernier 792 of the large-scale vernier component 742 has 5° increments 744, ranging in this case from 0° to 180°. The range and/or the size of the increments 744 of the large-scale vernier 792 and/or the increments 746 of the small-scale vernier 745 can vary in alternative embodiments, provided that the size of the increments 744 of the large-scale vernier 792 is larger than the size of the increments 746 of the small-scale vernier 745.

The orientation adjustment mechanism 340 in this example also includes a top plate 798. The top plate 798 can be a stand-alone component or, as in this case, can be part of a component 715 that is also used for the crossarm mounting system 350. The top plate 729 has a body 751. The body 751 of the top plate 729 is planar and substantially circular in shape in this case, but in alternative embodiments the body 751 can have any of a number of other shapes (e.g., square, oval) when viewed from above.

The top plate 798 can include one or more coupling features. For example, in this case, the body 751 of the top plate 798 includes a coupling feature 782 and one or more coupling features 781. In this case, as shown in FIG. 7D, the coupling feature 782 is in the form of a circular aperture that traverses the body 751 of the top plate 798, where the center of the coupling feature 782 is coincident with the center of the coupling feature 783 of the orientation adjustment plate 729. Also, the size of the coupling feature 782 of the top plate 798 in this case is substantially the same as the size of the coupling feature 783 of the orientation adjustment plate 729.

In this case, an independent coupling assembly 745 is used to couple the top plate 798, and orientation adjustment plate 729, and the middle portion 572 of the yoke 370 to each other. The coupling assembly 745 includes a coupling feature 749 in the form of a bolt and another coupling feature 747 in the form of a nut. The coupling feature 749 of the coupling assembly 745 is disposed within the coupling feature 782 of the top plate 798, the coupling feature 783 of the orientation adjustment plate 729, and the coupling feature 518 of the middle portion 572 of the yoke 370. The coupling feature 749 of the coupling assembly 745 serves as the axis of rotation for the orientation adjustment mechanism 340 relative to the yoke 370.

Also, there are two coupling features 781 (coupling feature 781-1 and coupling feature 781-2) in the form of circular apertures that traverse the body 751 of the top plate 798 and are disposed toward a distal portion of the top plate 798. The coupling features 781 have the same size as and complement (in this case, align with) the coupling features 784 of the orientation adjustment plate 729 when the coupling assembly 745 is coupled to the top plate 798, the orientation adjustment plate 729, and the middle portion 572 of the yoke 370.

The coupling features 781 of the top plate 798 and the coupling features 784 of the orientation adjustment plate 729 also align with the coupling features 519 of the middle portion 572 of the yoke 370. Specifically, coupling feature 781-1, coupling feature 784-1, and coupling feature 519-1 complement (in this case, align with) each other, and coupling feature 781-2, coupling feature 784-2, and coupling feature 519-2 complement (in this case, align with) each other.

In certain example embodiments, the top plate 798 and the orientation adjustment plate 729 of the orientation adjustment mechanism 340 are rotatably coupled, directly or indirectly, to the middle portion 572 of the yoke 370. In this case, one or more coupling features 748 are disposed in the coupling features 781 of the top plate 798, the coupling features 784 of the orientation adjustment plate 729, and the coupling features 519 of the middle portion 572 of the yoke 370. Specifically, in this example, coupling feature 748 is disposed in the coupling feature 781-1 of the top plate, in the coupling feature 784-1 of the orientation adjustment plate 729, and in the coupling feature 519-1 in the body 571 of the middle portion 572 of the yoke 370. In this case, there is no independent coupling feature (e.g., coupling feature 748) disposed in the coupling feature 781-2 of the top plate, in the coupling feature 784-2 of the orientation adjustment plate 729, and in the coupling feature 519-2 in the body 571 of the middle portion 572 of the yoke 370.

When the coupling feature 748 is completely tightened down (e.g., using another independent coupling feature such as a nut, hidden from view), the orientation adjustment mechanism 340 (which specifically in this case includes the top plate 798 and the orientation adjustment plate 729) and the middle portion 572 of the yoke 370 remain in a fixed position with respect to each other. When the coupling feature 748 is loosened, the orientation adjustment mechanism 340 and the middle portion 572 of the yoke 370 can be rotated with respect to each other. In this latter case, fine tuning of the orientation angle can be performed by utilizing the large-scale vernier 792 and the small-scale vernier 745. In certain example embodiments, a locking mechanism (e.g., a retractable pin, a screw) (not shown, but known to those of ordinary skill in the art) can be used to fix the orientation adjustment mechanism 340 in place relative to the yoke 370.

The crossarm mounting system 350 of the example crossarm retrofit system 380 is configured to fixedly couple the lighting assembly 320 (e.g., as shown in FIGS. 4A and 4B) to the crossarm 313. As discussed above, an example of a crossarm mounting system 350 is shown in FIGS. 7A through 7D. Referring to FIGS. 1 through 7D, the crossarm mounting system 350 can include one or more components. In this case, the crossarm mounting system 350 includes a bottom component 704, a top component 703, and a coupling assembly 785. The bottom component 704 has a body 705 that can include one or more features, including coupling features. In this case, the body 705 is planar until approaching its distal end, where there is a protrusion 759 that is angled downward. The downward protrusion 759 can help the crossarm mounting system 350 engage the crossarm 313.

The bottom component 704 can be a stand-alone component or, as in this case, can be part of the component 716 that is also used for the orientation adjustment plate 729 of the orientation adjustment mechanism 340. As a result, in this example, the body 705 of the bottom component 704 and the body 756 of the orientation adjustment plate 729 form a single piece. In alternative embodiments, the bottom component 704 and the orientation adjustment plate 729 can be separate pieces that are directly or indirectly coupled to each other. In yet other embodiments, the bottom component 704 and the orientation adjustment plate 729 can be separate components that are independent of each other.

In this case, the body 705 of the bottom component 704 of the crossarm mounting system 350 is configured to abut against one or more surfaces (in this case, the bottom surface) of a crossarm (e.g., crossarm 313). In certain example embodiments, the shape of the body 705 (or at least the shape of its inner surface) of the bottom component 704 can be configured to complement the shape of a surface (in this case, the bottom surface) of the crossarm 313. In this example, the body 705 of the bottom component 704 is planar and complements the planar bottom surface of the crossarm 313. Other shapes of the body 705 of the bottom component 704 can include, but are not limited to, a concave arc (along its length), a V-shape (along its length), and a sawtooth shape (along its length). The bottom component 704 in this example includes a coupling feature 706 in the form of a circular aperture that traverses the body 705 and is positioned proximate to the downward protrusion 759 and at the center along the width of the body 705.

In some alternative embodiments, the bottom component 704 can abut against multiple surfaces (e.g., the front surface and the bottom surface) of the crossarm 313 rather than a single surface, as in this example. In such cases, the bottom component 704 can include multiple pieces (e.g., directly or indirectly coupled to each other). Alternatively in such cases, the body 705 of the bottom component 704 can be multi-dimensional so that the bottom component 704 can abut against multiple surfaces of the crossarm 313.

The top component 703 of the crossarm mounting system 350 can have a single body portion (e.g., similar to how the bottom component 704 is shown in FIGS. 7A through 7D) or multiple body portions, as in this example. In this case, the top component 703 has a top body portion 754 and a front body portion 753 that are formed from a continuous piece. In alternative embodiments, the top body portion 754 and the front body portion 753 can be separate pieces that are directly or indirectly coupled to each other. In yet other embodiments, the top body portion 754 and the front body portion 753 can be separate components that are independent of each other.

Each body portion of the top component 703 of the crossarm mounting system 350 can include one or more features, including coupling features. In this case, the front body portion 753 of the top component 703 is oriented substantially perpendicular to the top body portion 754 (and also to the top plate 798 of the orientation adjustment mechanism 340). In alternative embodiments, the angle between the front body portion 753 and the top body portion 754 can vary based on any of a number of factors, including but not limited to the shape of the crossbar 313. Similarly, in alternative embodiments, the angle between the front body portion 753 and the top plate 798 of the orientation adjustment mechanism 340 can vary based on any of a number of factors, including but not limited to the shape of the crossbar 313 and the configuration of the middle portion 752 of the yoke 370.

The front body portion 753 of the top component 703 of the crossarm mounting system 350 is configured to abut against one or more surfaces (in this case, the front surface) of a crossarm (e.g., crossarm 313). In certain example embodiments, the shape of the front body portion 753 (or at least the shape of its inner surface) of the top component 703 can be configured to complement the shape of a surface (in this case, the front surface) of the crossarm 313. In this example, the front body portion 753 of the top component 703 is planar and complements the planar front surface of the crossarm 313.

The front body portion 753 in this case is wider than the width of the top body portion 754. Under this configuration, the width of the front body portion 753 not only can be utilized for helping to secure the front body portion 753 against the front surface of the crossarm 313, but the added width of the front body portion 753 can also be used as an alignment reference feature for the crossarm retrofit system 380. For example, assuming that the orientation (e.g., the angle) of the front surface of the crossarm 313 relative to the area to be illuminated by the lamp 325 is known, the added width of the front body portion 753, when engaged with the front surface of the crossarm 313, ensures that an optimal orientation angle for the lamp can be known before the lighting assembly 320 is installed.

When the tilt and orientation angles are known ahead of time (using any of a number of methods currently known by those of ordinary skill in the art) for each lamp 325, the tilt angle can be set with a high degree of definition and accuracy using the tilt adjustment mechanism 330 and the orientation angle can be set with a high degree of definition and accuracy using the orientation adjustment mechanism 340. Further, these settings can be made on the ground by an installer before the installer has to elevate to the height of the crossarm 313. In this way, example crossarm retrofit systems 380 promote safety by minimizing the amount of time that the installer is exposed to excessive heights in installing the lighting assembly 320.

The front body portion 753 can have any height H, including a height H that is substantially the same as the height of the crossarm 313, as in this example. The shape of the front body portion 753 of the top component 703 can be configured to complement the shape of the front surface of the crossarm 313. In this example, the front body portion 753 of the top component 703 is planar and complements the planar front surface of the crossarm 313.

In this case, the top body portion 754 of the top component 703 of the crossarm mounting system 350 is configured to abut against one or more surfaces (in this case, the top surface) of a crossarm (e.g., crossarm 313). In certain example embodiments, the shape of the body 705 (or at least the shape of its inner surface) of the top body portion 754 of the top component 703 can be configured to complement the shape of a surface (in this case, the top surface) of the crossarm 313. In this example, the top body portion 754 of the top component 703 is planar and complements the planar top surface of the crossarm 313. Other shapes of the top body portion 754 of the top component 703 can include, but are not limited to, a concave arc (along its length), a V-shape (along its length), and a sawtooth shape (along its length).

The top body portion 754 of the top component 703 in this example includes a coupling feature 767 in the form of a circular aperture that traverses the top body portion 754 and is positioned proximate to the upward protrusion 758 and at the center along the width of the top body portion 754. The distance D between the coupling feature 767 and the front body portion 753 can be substantially the same as the depth of the top surface and the bottom surface of the crossarm 313. The upward protrusion 758 disposed at the distal end of the top component 703 can help the crossarm mounting system 350 engage the crossarm 313.

The top component 703 of the crossarm mounting system 350 can be a stand-alone component or, as in this case, can be part of the component 715 that is also used for the top plate 798 of the orientation adjustment mechanism 340. As a result, in this example, the top body portion 754 of the top component 703 of the crossarm mounting system 350, the front body portion 753 of the top component 703 of the crossarm mounting system 350, and the body 751 of the top plate 798 form a single piece. In alternative embodiments, the top component 703 and the top plate 798 can be separate pieces that are directly or indirectly coupled to each other. In yet other embodiments, the top component 703 and the top plate 798 can be separate components that are independent of each other.

When the component 715 and the component 716 are coupled to each other (e.g., using coupling assembly 745, using coupling feature 748), the crossarm mounting system 350 can receive the crossarm 313. By leading with the upward protrusion 758 of the top component 703 and the bottom protrusion 759 of the bottom component 704, the crossarm mounting system 350 can be slid over the crossarm 313 to fill the space between the top body portion 754 of the top component 703 and the body 705 of the bottom component 704 until the crossarm 313 abuts against the front body portion 753.

At that point, the coupling assembly 785 can engage the top component 703 and the bottom component 704. When this occurs, the coupling assembly 785 can serve one or more purposes. For example, when the coupling assembly 785 engages the top component 703 and the bottom component 704, the top component 703 and the bottom component 704 become compressed toward each other and clamp down on the top surface and the bottom surface, respectively, of the crossarm 313. As another example, when the coupling assembly 785 engages the top component 703 and the bottom component 704, the coupling assembly 785 can form a rear body component of the crossarm mounting system 350 that can abut against a rear surface of the crossarm 313.

The ultimate goal of the coupling assembly 785 is to ensure that the crossarm mounting system 350 maintains a firm and fixed position relative to the crossarm 313 for an extended period of time (e.g., years, decades). The coupling assembly 785 can have any of a number of configurations (e.g., include any of a number of coupling features) to accomplish this goal. For example, in this case, the coupling assembly 785 includes a bolt 781, a nut 783, and a sleeve 782. The bolt 781 is disposed in the coupling feature 767 of the top component 703, the sleeve 782, and the coupling feature 706 of the bottom component 704. The sleeve 782 is positioned between the top component 703 and the bottom component 704. The sleeve 782 can protect the mating threads of the bolt 781 and also abut against the rear surface of the crossarm 313. The nut 783 couples to the bolt 781 to keep the coupling assembly 785 engaged with the top component 703 and the bottom component 704.

When the coupling assembly 785 has different configurations in alternative embodiments, the components of the coupling assembly 785 can be independent of or integrated with the other components of the crossarm mounting system 350. For example, the coupling assembly 785 can be configured as a hinged clamp and a clamp receiver that is integrated with the top component 703 and the bottom component 704. Those of ordinary skill in the art will appreciate that any of a number of other configurations of the coupling assembly 785 can be used to achieve the goal of the coupling assembly 785.

Figure 8A:
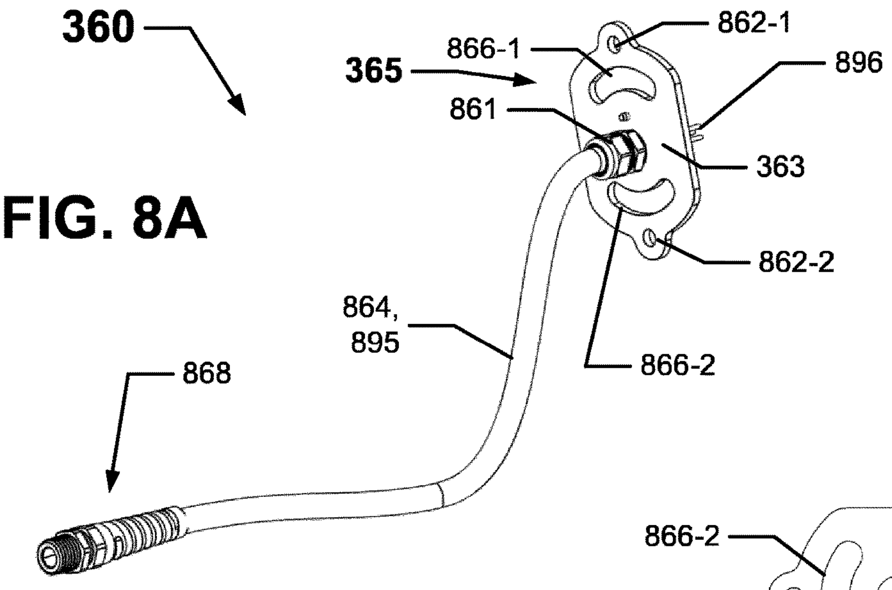
FIGS. 8A and 8B show the electrical interface system of the crossarm retrofit system of FIGS. 3 through 4B.
Figure 8B:
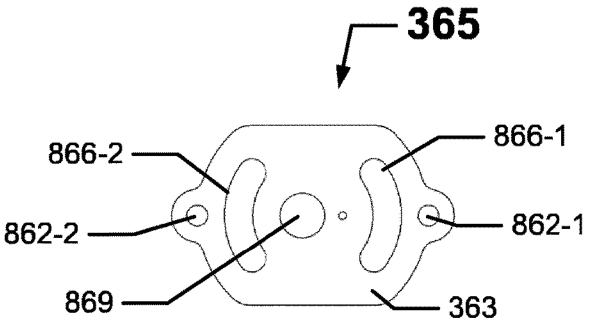

The electrical interface system 360 of the example crossarm retrofit system 380 is configured to couple the electrical conductors of the lamp 325 to an electrical cable (e.g., electrical cable 295-18). The electrical interface system 360 can include multiple components. An example of the electrical interface system 360 is shown in FIGS. 8A and 8B. FIG. 8A shows a perspective view of the electrical interface system 360. FIG. 8B shows a front view of an interface plate 365 of the electrical interface system 360.

Referring to FIGS. 1 through 8B, the electrical interface system 360 of FIGS. 8A and 8B includes the interface plate 365, a grommet 861, an electrical cable 895 (having one or more electrical conductors 896), and a cord grip 868. The electrical cable 895 (including the associated electrical conductors 896) can be substantially the same as the electrical cables 295 and the electrical conductors 296 discussed above. The electrical conductors 896 at the distal end of the electrical cable 895 can couple, directly (e.g., wire-to-wire connection) or indirectly (e.g., using electrical connectors), to electrical conductors 296 of an electrical cable 295 that are accessible through an aperture 294 in a crossarm (e.g., crossarm 113, crossarm 313). In some cases, the electrical cable 895 can be disposed within a conduit 864 (e.g., a flexible conduit, a rigid conduit) between the cord grip 868 and the grommet 861.

The cord grip 868 is made of a flexible, durable, resilient material (e.g., rubber) that provides a secure transition for the proximal end of the electrical cable 895 to be disposed within the housing 324 of the lamp 325 to electrically couple to one or more components (e.g., a driver) inside the housing 324. In some cases, the cord grip 868 can be permanently affixed to the housing 324 of the lamp 325. In alternative cases, the cord grip 868 can be removably coupled to the housing 324 of the lamp 325.

The interface plate 365 couples to the crossarm (e.g., crossarm 313) and serves multiple functions. For example, the interface plate 365, through an aperture 869 that traverses the body 363 of the interface plate 365, allows an electrical cable (e.g., electrical cable 895, electrical cable 295) to pass therethrough. The aperture 869 is at least partially coincident with the aperture 294 in the crossarm (e.g., crossarm 113, crossarm 313) when the interface plate 365 is coupled to the crossarm. In this case, the aperture 869 is offset from the center of the body 363 of the interface plate 365. In alternative embodiments, the aperture 869 can be disposed at any other location on the body 363, including in the center.

As another example, the interface plate 365 can serve to further secure the electrical interface system 360 to the crossarm. In this case, the interface plate 365 has two coupling features 862 (coupling feature 862-1 and coupling feature 862-2) in the form of apertures that traverse protruding parts of the body 363 at opposite ends along the length of the interface plate 365. These coupling features 862 are configured to directly or indirectly couple to a securing component, such as securing component 304 shown in FIG. 3. In this case, the coupling features 862 receive the ends of the securing component 304, which is U-shaped and sized to abut against one or more (in this case, the front, top, and rear) surfaces of the crossarm 313. Other coupling features (e.g., nuts) can be used to couple the securing component 304 to the coupling features 862. The securing component 304 can have other configurations to achieve the function of further securing the electrical interface system 360 to the crossarm.

The interface plate 365 can include one or more coupling features 866 to directly or indirectly couple the interface plate 365 to the crossarm (crossarm 113, crossarm 313) adjacent to the aperture 294 in the crossarm. In this case, the interface plate has two coupling features 866 (coupling feature 866-1 and coupling feature 866-2) in the form of curved slots that traverse the body 363 of the interface plate 365 and are symmetrically disposed around the center of the body 363. The positioning and configuration of the coupling features 866 are designed to complement the coupling features 293 on the crossarm. In this case, independent coupling features (e.g., bolts, screws) are used to engage the coupling features 866 of the interface plate 365 and the coupling features 293 of the crossarm.

The grommet 861 is a generally tubular-shaped component is that is configured to receive the electrical cable 895 while also creating a liquid-tight seal with the aperture 869 in the body 363 of the interface plate 365. Because the interface plate 365 abuts against and is coupled to the crossarm at the aperture 295, the grommet 861 can keep contaminants (e.g., dirt, moisture) from entering into the cavity of the crossarm, thereby reducing the chance that such contaminants can cause damage (e.g., corrosion, an electrical fault) inside the crossarm.

Figure 9:
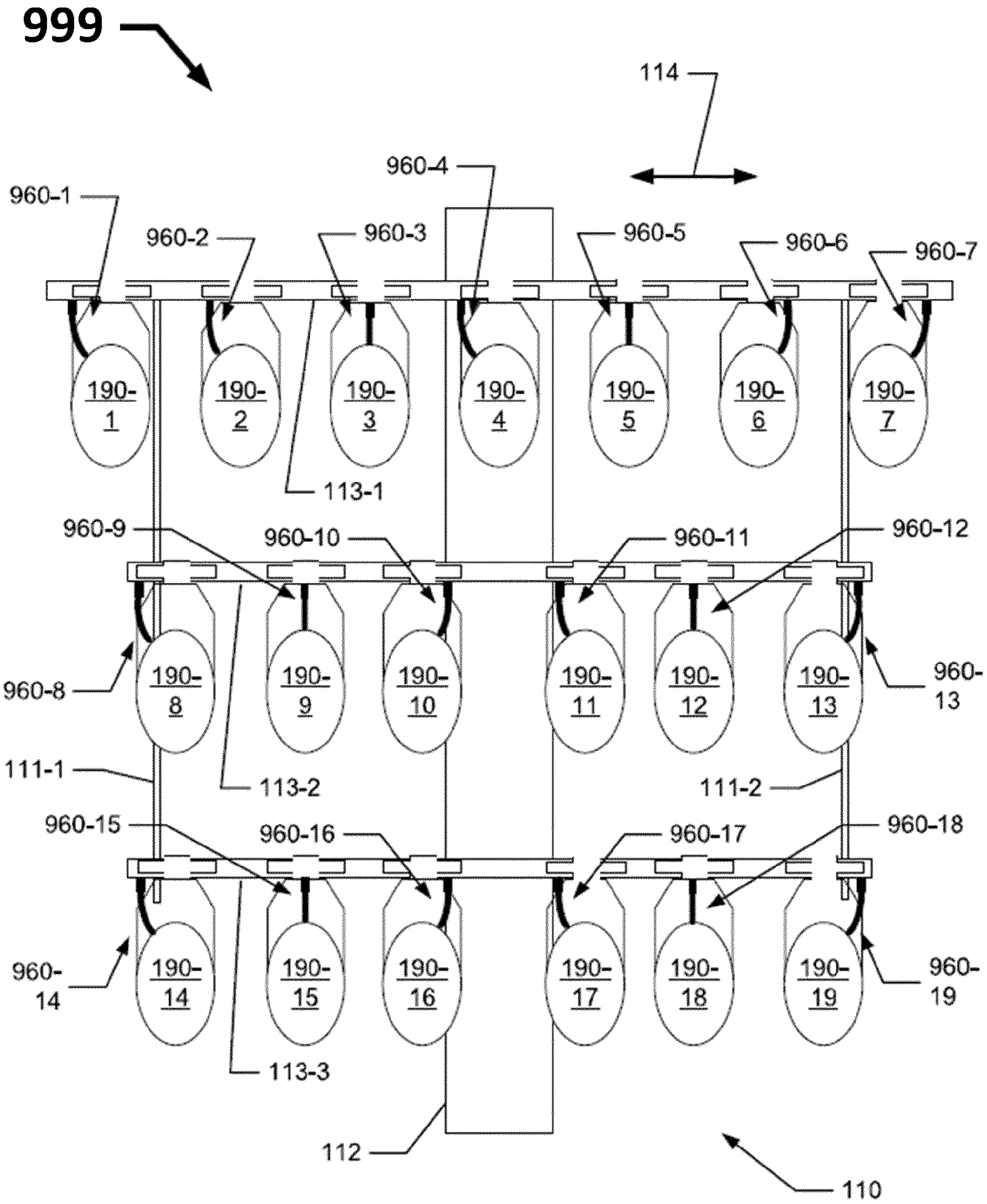
FIG. 9 shows a lighting array according to certain example embodiments.

FIG. 9 shows a lighting array 999 according to certain example embodiments. Referring to FIGS. 1 through 9, the lighting array 999 includes a frame 910 (with a pole 912, three crossarms 913 (crossarm 913-1, crossarm 913-2, and crossarm 913-3), and two vertical supports 911 (vertical support 911-1 and vertical support 911-2). The frame 910 and its various components are substantially similar to the frame 110 and its corresponding components (e.g., the pole 112, the crossarms 113, the vertical supports 111) discussed above. The lighting array 999 of FIG. 9 also includes 19 lighting assemblies 920, which are substantially similar to the lighting assembly 320 discussed above. The lamps (similar to the lamp 325 discussed above) of the lighting assemblies 920 are used to replace older style lamps that are less efficient and/or effective.

Lighting assembly 920-1, lighting assembly 920-2, lighting assembly 920-3, lighting assembly 920-4, lighting assembly 920-5, lighting assembly 920-6, and lighting assembly 920-7 are mounted on crossarm 913-1. Lighting assembly 920-8, lighting assembly 920-9, lighting assembly 920-10, lighting assembly 920-11, lighting assembly 920-12, and lighting assembly 920-13 are mounted on crossarm 913-2. Lighting assembly 920-14, lighting assembly 920-15, lighting assembly 920-16, lighting assembly 920-17, lighting assembly 920-18, and lighting assembly 920-19 are mounted on crossarm 913-3.

Because the lamps of the lighting assemblies 920 of the lighting array 999 have different lighting characteristics relative to the original lamps that are being replaced, the placement of the lamps on each crossarm 913 may be different than the placement of the original lamps on those crossarms 913. The distance 914 between the apertures (similar to the apertures 294 discussed above), and so also the distance 914 between the electrical cables (similar to the electrical cables 295 discussed above) in the crossarms 913 do not change when the lamps are replaced. As a result, the flexibility offered by the electrical interface system 960 of each example lighting assembly 920 allows for the optimal placement of the lamps on each crossarm 913, regardless of where the aperture/electrical cable pairs in each crossarm 913 are located.

For example, with respect to crossarm 913-1, each aperture/electrical cable pair is equidistantly spaced from each adjacent aperture/electrical cable pair by distance 914. By contrast, lighting assembly 920-1, lighting assembly 920-2, and lighting assembly 920-3 are clustered on the left side of the pole 912, and lighting assembly 920-4, lighting assembly 920-5, lighting assembly 920-6, and lighting assembly 920-7 are clustered on the right side of the pole 912. The electrical interface system 960-1 of lighting assembly 920-1 extends to the left of its associated lamp. The electrical interface system 960-2 of lighting assembly 920-2 also extends to the left of its associated lamp, but to a lesser extent than the electrical interface system 960-1. The electrical interface system 960-3 of lighting assembly 920-3 also extends to the left of its associated lamp, but to a lesser extent than the electrical interface system 960-2.

For the grouping of lighting assembly 920-4 through lighting assembly 920-7, the electrical interface system 960-4 of lighting assembly 920-4 extends to the left of its associated lamp. The electrical interface system 960-5 of lighting assembly 920-5 also extends to the left of its associated lamp, but to a lesser extent than the electrical interface system 960-4. The electrical interface system 960-7 of lighting assembly 920-7 extends to the right of its associated lamp. The electrical interface system 960-6 of lighting assembly 920-6 also extends to the right of its associated lamp, but to a lesser extent than the electrical interface system 960-7.

With respect to crossarm 913-2, each aperture/electrical cable pair is equidistantly spaced from each adjacent aperture/electrical cable pair by distance 914. By contrast, lighting assembly 920-8, lighting assembly 920-9, and lighting assembly 920-10 are clustered on the left side of the pole 912, and lighting assembly 920-11, lighting assembly 920-12, and lighting assembly 920-13 are clustered on the right side of the pole 912. The electrical interface system 960-8 of lighting assembly 920-8 extends to the left of its associated lamp. The electrical interface system 960-9 of lighting assembly 920-9 does not extend on either side of its associated lamp. The electrical interface system 960-10 of lighting assembly 920-10 extends to the right of its associated lamp. Similarly, the electrical interface system 960-11 of lighting assembly 920-11 extends to the left of its associated lamp. The electrical interface system 960-12 of lighting assembly 920-12 does not extend on either side of its associated lamp. The electrical interface system 960-13 of lighting assembly 920-13 extends to the right of its associated lamp.

With respect to crossarm 913-3, each aperture/electrical cable pair is equidistantly spaced from each adjacent aperture/electrical cable pair by distance 914. By contrast, lighting assembly 920-14, lighting assembly 920-15, and lighting assembly 920-16 are clustered on the left side of the pole 912, and lighting assembly 920-17, lighting assembly 920-18, and lighting assembly 920-19 are clustered on the right side of the pole 912. The electrical interface system 960-14 of lighting assembly 920-14 extends to the left of its associated lamp. The electrical interface system 960-15 of lighting assembly 920-15 does not extend on either side of its associated lamp. The electrical interface system 960-16 of lighting assembly 920-16 extends to the right of its associated lamp. Similarly, the electrical interface system 960-17 of lighting assembly 920-17 extends to the left of its associated lamp. The electrical interface system 960-18 of lighting assembly 920-18 does not extend on either side of its associated lamp. The electrical interface system 960-19 of lighting assembly 920-19 extends to the right of its associated lamp.

In terms of a method for installing lighting assemblies 960 that include example crossarm retrofit systems (e.g., crossarm retrofit system 380), the new lamp (e.g., lamp 325) can be coupled to the distal ends (distal end 573, distal end 574) of the yoke (e.g., yoke 370). Based on photometric modeling and location data associated with the frame (e.g., frame 110, frame 910) and the area to be illuminated, the tilt angle and the orientation angle of the lamp can be set and maintained using the tilt adjustment mechanism 330 and the orientation adjustment mechanism 340, respectively, by an installer while the installer is still on the ground.

The installer can then be raised to the elevation of the appropriate crossarm (e.g., crossarm 113-3, crossarm 913-1)

to remove the existing (old) lamp to be replaced, exposing the electrical cable (e.g., electrical cable 295) and its associated electrical conductors (e.g., electrical conductors 296). The lighting assembly 920 can then be mounted to the crossarm using the crossarm mounting system 350. Specifically, leading with the upward protrusion 758 and the downward protrusion 759, the crossarm mounting system 350 can slide over the crossarm until the crossarm is disposed within the space bounded by the top component 703 and the bottom component 704. When the crossarm abuts against the front body portion 753, the coupling assembly 785 can become engaged with the top component 703 and the bottom component 704.

If the lighting assembly 920 needs to move in either direction along the crossarm, the coupling assembly 785 can be loosened enough to allow such lateral movement. When the lighting assembly 920 is moved to the desired position, the coupling assembly 785 can be tightened to firmly secure the crossarm mounting system 350 against the crossarm. At that point, the electrical connection can be made by coupling the electrical conductors 896 of the electrical cable 895 of the lamp 235 to electrical conductors 296 of the electrical cable 295 positioned in the crossarm, and also by coupling the interface plate 365 to the crossarm at the aperture (e.g., aperture 294) and inserting the grommet 861 into the aperture 869 of the interface plate 365.

Example embodiments can be used to quickly, accurately, and securely retrofit one or more lamps mounted on an elevated frame or other structure. Most of the work involving orienting the lamp (e.g., setting a tilt angle, setting an orientation angle) can be done safely on the ground before an installer reaches the height of the elevated frame or other structure. Example embodiments allow for precisely setting the tilt and orientation angles. Example embodiments can also be used to quickly and securely couple the assembly to the crossarm or other structure. Example embodiments can also allow for flexibility in terms of the final location that the lamp is positioned along the length of the crossarm or other structure. Example embodiments can be used in new installations of lighting array systems as well as retrofitting or replacing the lamps of existing lighting array systems. Example embodiments also provide a number of other benefits. Such other benefits can include, but are not limited to, increased ease of maintenance, greater ease of use, improved performance with more efficient lamps, and compliance with industry standards that apply to elevated lighting array systems.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A crossarm retrofit system for a luminaire, the crossarm retrofit system comprising:

a crossarm mounting system coupled to a crossarm, wherein the crossarm mounting system comprises a bottom component, a top component, and a coupling assembly, wherein the top component is configured to abut against a top surface of the crossarm, wherein the bottom component is configured to abut against a bottom surface of the crossarm, wherein the coupling assembly is configured to be disposed adjacent to a rear surface of the crossarm, and wherein the coupling assembly is further configured to force the top component and the bottom component to engage and secure the crossarm; and an orientation adjustment mechanism coupled to a mounting yoke, wherein the orientation adjustment mechanism comprises:

a first component having a large-scale vernier disposed thereon; and a second component having a small-scale vernier disposed thereon, wherein the large-scale vernier and the small-scale vernier are disposed adjacent to each other and are rotatably disposed relative to each other, and wherein setting the large-scale vernier and the small-scale vernier sets an orientation angle of the luminaire relative to the crossarm.

2. The crossarm retrofit system of claim 1, wherein the coupling assembly of the crossarm mounting system comprises a sleeve, a bolt, and a nut, wherein the sleeve is configured to be disposed between the top component and the bottom component and adjacent to the rear surface of the crossarm, wherein the bolt is inserted into the sleeve, and wherein the nut is configured to be coupled to a distal end of the bolt.

3. The crossarm retrofit system of claim 1, wherein the top component of the crossarm mounting system comprises a front body portion that has a first width that is larger than a second width of a remainder of the top component, wherein the front body portion has an inner surface with a contour that substantially complements a shape of the crossarm where the front body portion abuts against the crossarm.

4. The crossarm retrofit system of claim 1, wherein the top component of the crossarm mounting system are part of a first component, wherein the bottom component of the crossarm mounting system is part of a second component, wherein the large-scale vernier of the orientation adjustment mechanism is disposed toward a proximal end of the second component away from the bottom component, and wherein the small-scale vernier of the orientation adjustment mechanism is disposed toward a proximal end of the first component away from the top component.

5. The crossarm retrofit system of claim 4, wherein the first component and the second component are coupled to each other at a point where the large-scale vernier and the small-scale vernier rotate with respect to each other.

6. A crossarm retrofit system for a luminaire, the crossarm retrofit system comprising:

a crossarm mounting system coupled to a crossarm, wherein the crossarm mounting system comprises a bottom component, a top component, and a coupling assembly, wherein the top component is configured to abut against a top surface of the crossarm, wherein the bottom component is configured to abut against a bottom surface of the crossarm, wherein the coupling assembly is configured to be disposed adjacent to a rear surface of the crossarm, and wherein the coupling assembly is further configured to force the top component and the bottom component to engage and secure the crossarm; and a tilt adjustment mechanism coupled to a housing of the luminaire, wherein the tilt adjustment mechanism comprises:

a first component having a large-scale vernier disposed thereon; and a second component having a small-scale vernier disposed thereon, wherein the large-scale vernier and the small-scale vernier are disposed adjacent to each other and are rotatably disposed relative to each other, and wherein setting the large-scale vernier and the small-scale vernier sets a tilt angle of the luminaire relative to the crossarm.

7. The crossarm retrofit system of claim 6, wherein the first component and the second component are coupled to each other at a point where the large-scale vernier and the small-scale vernier rotate with respect to each other.

8. The crossarm retrofit system of claim 6, wherein the large-scale vernier is disposed on a distal end of a mounting yoke.

9. The crossarm retrofit system of claim 1, further comprising an electrical interface system, wherein the electrical interface system comprises:

an electrical cable;

an interface plate comprising a body and a first plurality of coupling features, wherein the body has an aperture that traverses therethrough, wherein the first plurality of coupling features and the second plurality of coupling features are disposed around the aperture, and wherein the first plurality of coupling features is configured to couple to complementary coupling features disposed on the crossbar; and a grommet that is configured to be disposed within the aperture, wherein the grommet is further configured to have the electrical cable disposed therein.

10. The crossarm retrofit system of claim 9, wherein the electrical interface system further comprises a securing component that is configured to couple to a second plurality of coupling features disposed on the interface plate, and wherein the securing component is further configured to abut against at least one outer surface of the crossarm.

11. The crossarm retrofit system of claim 9, wherein the electrical interface system further comprises a flexible conduit that is configured to have the electrical cable disposed therein.

12. The crossarm retrofit system of claim 9, wherein the electrical interface system is configured to allow the luminaire to be mounted at a location on the crossarm that differs from a prior location of a prior luminaire mounted on the crossarm, wherein the luminaire replaces the prior luminaire, and wherein the luminaire receives power from an existing electrical cable used to provide the power to the prior luminaire.

13. The crossarm retrofit system of claim 1, wherein the mounting yoke is rotatably coupled to a luminaire, wherein the mounting yoke comprises:

a distal end comprising a first coupling feature and a second coupling feature, wherein the first coupling feature is configured to couple to a tilt adjustment mechanism, and wherein the second coupling feature is configured to couple to the luminaire; and a middle portion disposed adjacent to the distal end, wherein the middle portion comprises a first coupling feature and a second coupling feature that are configured to couple to the crossarm mounting system and allow the mounting yoke to rotate relative to the crossarm mounting system.

14. The crossarm retrofit system of claim 1, further comprising a tilt adjustment mechanism, wherein the tilt adjustment mechanism is configured to set a tilt angle of the luminaire and the orientation adjustment mechanism is configured to set an orientation angle of the luminaire before the luminaire is mounted to the crossarm.

* * * * *